(12) United States Patent
Shao et al.

(10) Patent No.: US 12,067,230 B2
(45) Date of Patent: Aug. 20, 2024

(54) COMPUTER PLATFORM WITH SHARED USER EXPERIENCE INTERFACE

(71) Applicant: Google LLC, Mountain View, CA (US)

(72) Inventors: Kejia Shao, Mountain View, CA (US); Diego Rivas, Mountain View, CA (US); Ryosuke Matsumoto, Dublin, CA (US); Min Kim, Burlingame, CA (US); Nupur Jain, Mountain View, CA (US); Fan Zhang, Mountain View, CA (US); Jesse Johnston, Mountain View, CA (US); Shiba Sheikh, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/987,412

(22) Filed: Nov. 15, 2022

(65) Prior Publication Data

US 2023/0305694 A1 Sep. 28, 2023

Related U.S. Application Data

(60) Provisional application No. 63/324,302, filed on Mar. 28, 2022.

(51) Int. Cl.
*G06F 3/0488* (2022.01)
*G06F 1/3296* (2019.01)
(Continued)

(52) U.S. Cl.
CPC .......... *G06F 3/0488* (2013.01); *G06F 1/3296* (2013.01); *G06F 3/011* (2013.01);
(Continued)

(58) Field of Classification Search
CPC ...... G06F 3/0488; G06F 1/3296; G06F 3/011; G06F 3/0227; G06F 3/0395;
(Continued)

(56) References Cited

U.S. PATENT DOCUMENTS

| 5,977,957 A | 11/1999 | Miller et al. |
| 2007/0049358 A1 | 3/2007 | Kang et al. |

(Continued)

FOREIGN PATENT DOCUMENTS

EP 3038330 A1 6/2016

OTHER PUBLICATIONS

Acer-Chromebase for Google Meet, Google Workspace, retrieved from the internet on Dec. 9, 2021, pp. 1-4.

(Continued)

*Primary Examiner* — Amit Chatly
(74) *Attorney, Agent, or Firm* — Botos Churchill IP Law LLP

(57) ABSTRACT

Aspects of the technology utilize an integrated computing device that supports a shared, communal interaction while still enabling a personalized experience. This includes a unified desktop experience based on presence, a shared family or common space as part of an ambient visual display, and seamless switching involving user interface elements when the display device is rotatable. A presence sensor detects whether someone is at or near the device. When at least one person is identified, specific information is surfaced on a display based on the current context, enabling the person(s) to interact with the device in selected ways. The device evaluates a current presentation state of the display and selects content items to present. The presentation state can include content currently being displayed, other context signals, or any other information (Continued)

associated with the state of the device, such as whether the device is locked or logged-in, for example.

20 Claims, 17 Drawing Sheets

(51) Int. Cl.
*G06F 3/01* (2006.01)
*G06F 3/02* (2006.01)
*G06F 3/039* (2013.01)
*G06V 40/16* (2022.01)

(52) U.S. Cl.
CPC .......... *G06F 3/0227* (2013.01); *G06F 3/0395* (2013.01); *G06V 40/172* (2022.01)

(58) Field of Classification Search
CPC ...... G06F 1/3231; G06F 3/023; G06F 3/0304; G06F 1/1605; G06V 40/172
See application file for complete search history.

(56) References Cited

U.S. PATENT DOCUMENTS

| | | | | |
|---|---|---|---|---|
| 2010/0007613 | A1* | 1/2010 | Costa | G06F 1/1616 345/173 |
| 2016/0110585 | A1* | 4/2016 | Govindaraj | H04N 7/185 382/118 |
| 2017/0140507 | A1* | 5/2017 | Abuelsaad | G09G 5/00 |
| 2021/0208664 | A1* | 7/2021 | Thomas | G06F 1/1616 |
| 2021/0382678 | A1* | 12/2021 | Back | H04M 3/568 |
| 2022/0103675 | A1* | 3/2022 | Hulbert | G06Q 20/40145 |
| 2023/0127758 | A1* | 4/2023 | Ramasamy | G06F 21/572 726/26 |
| 2023/0188832 | A1* | 6/2023 | Xu | H04N 23/632 348/333.01 |

OTHER PUBLICATIONS

Chromebase Overview-Google Meet Hardware Help, retrieved from the internet on Dec. 9, 2021, pp. 1-2.

HP Chromebase 21.5 inch All-in-One Desktop, The first Chromebase All-in-One designed to live in the heart of your home, Google Chromebook, retrieved from the internet on Dec. 9, 2021, pp. 1-8.

HP Chromebase All-in-One desktop, The All-in-One for everyone, retrieved from the internet on Dec. 9, 2021, pp. 1-5.

Pickett, Zane, HP Chromebase All-In-One 21.5 Inch Desktop Turns to Disrupt The Market, Moor Insights and Strategy, Oct. 27, 2021, pp. 1-10.

International Search Report and Written Opinion for International Application No. PCT/US2022/051353 dated Mar. 20, 2023 (14 pages).

Lee, Youngki, et al., "MobiCon", Communications of the ACM, Association for Computing Machinery, Inc, United States, vol. 55, No. 3, Mar. 1, 2012, pp. 54-65, XP058675703.

Stenger, Bjorn, et al., "A vision-based system for display interaction", People and Computers, British Computer Society, BISL P. O. Box 1454 Station Road Swinton; SN1 1TG UK, Sep. 1, 2009, pp. 163-168, XP05813S382, chapters 1-5.

Qin, Yue, et al., "ProxiMic: Convenient Voice Activation via Close-to-Mic Speech Detected by a Single Microphone", Proceedings of the 2021 CHI Conference on Human Factors in Computing Systems, ACMPUB27, New York, NY, USA, May 6, 2021, pp. 1-12, XP058557377.

* cited by examiner

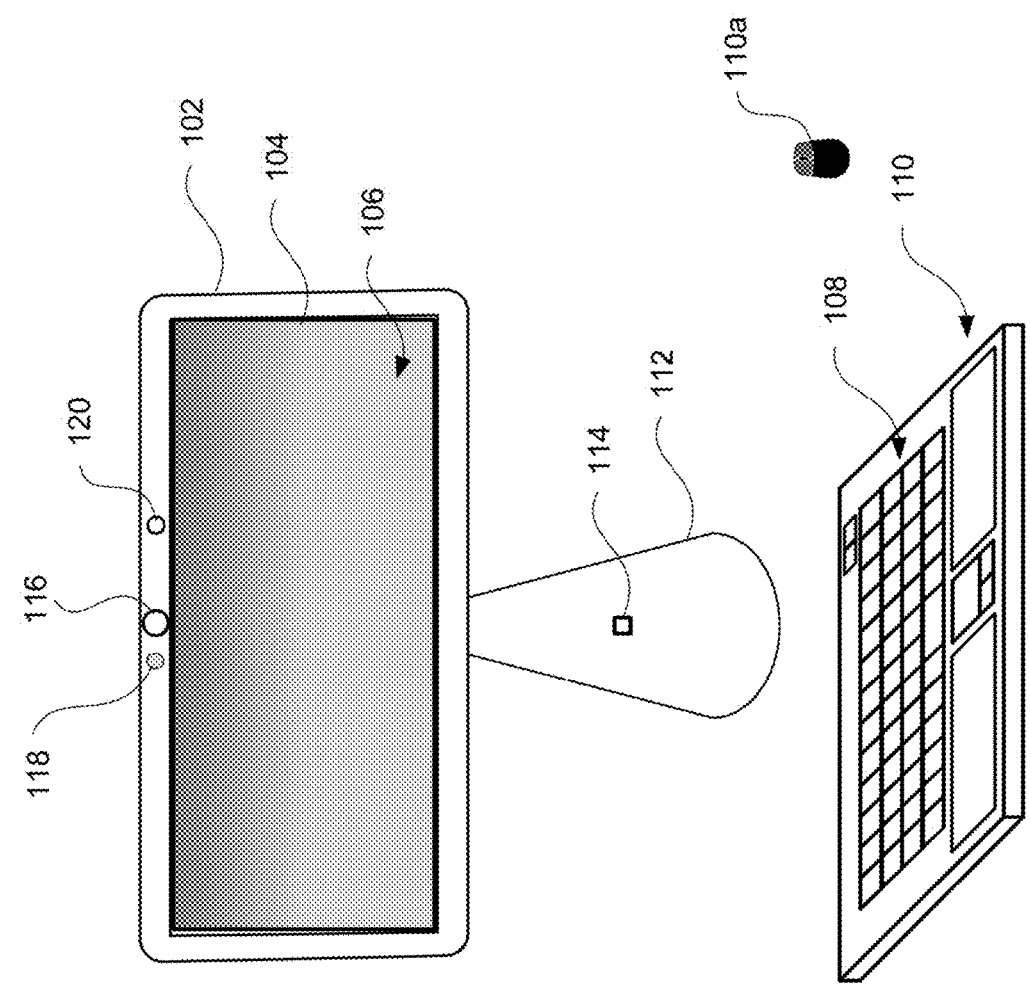

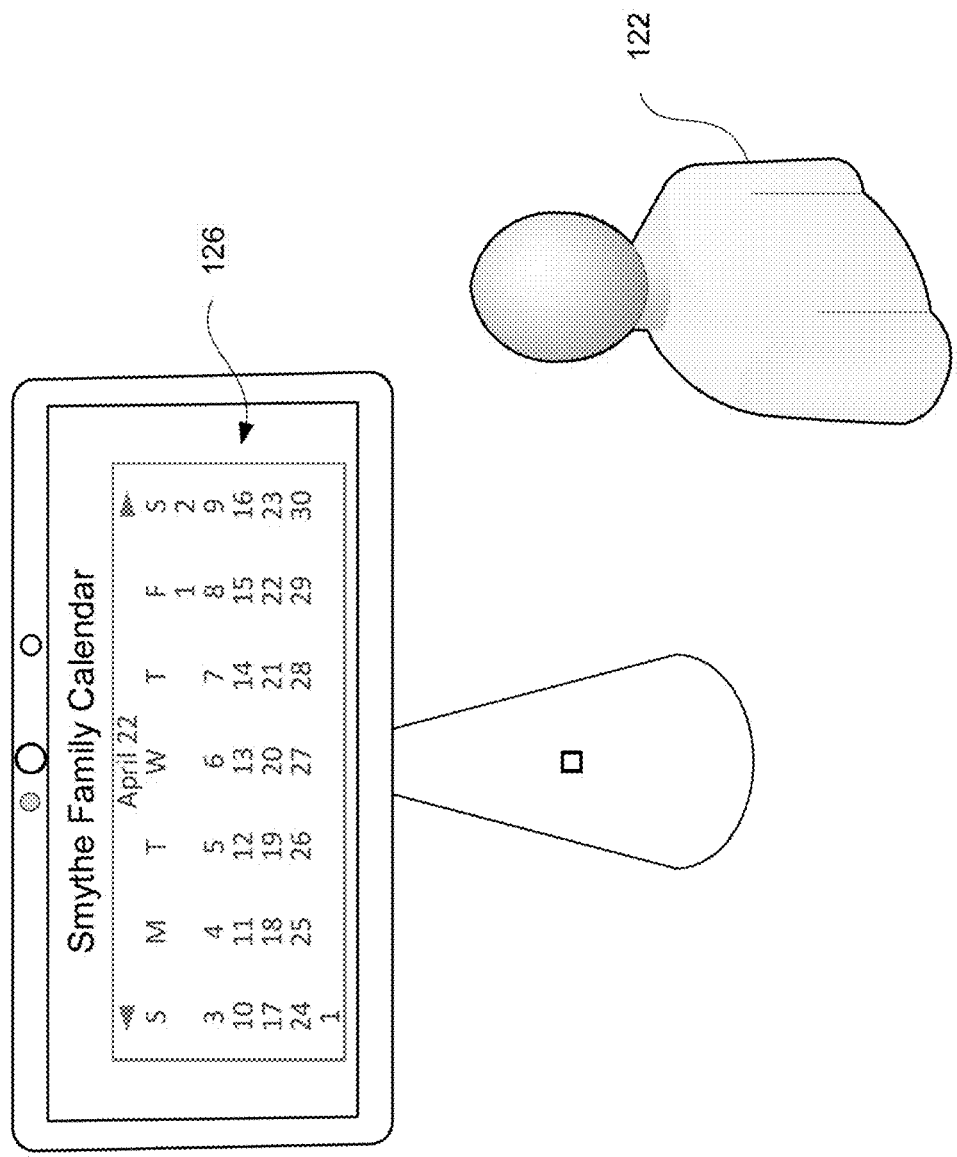

170

160

200

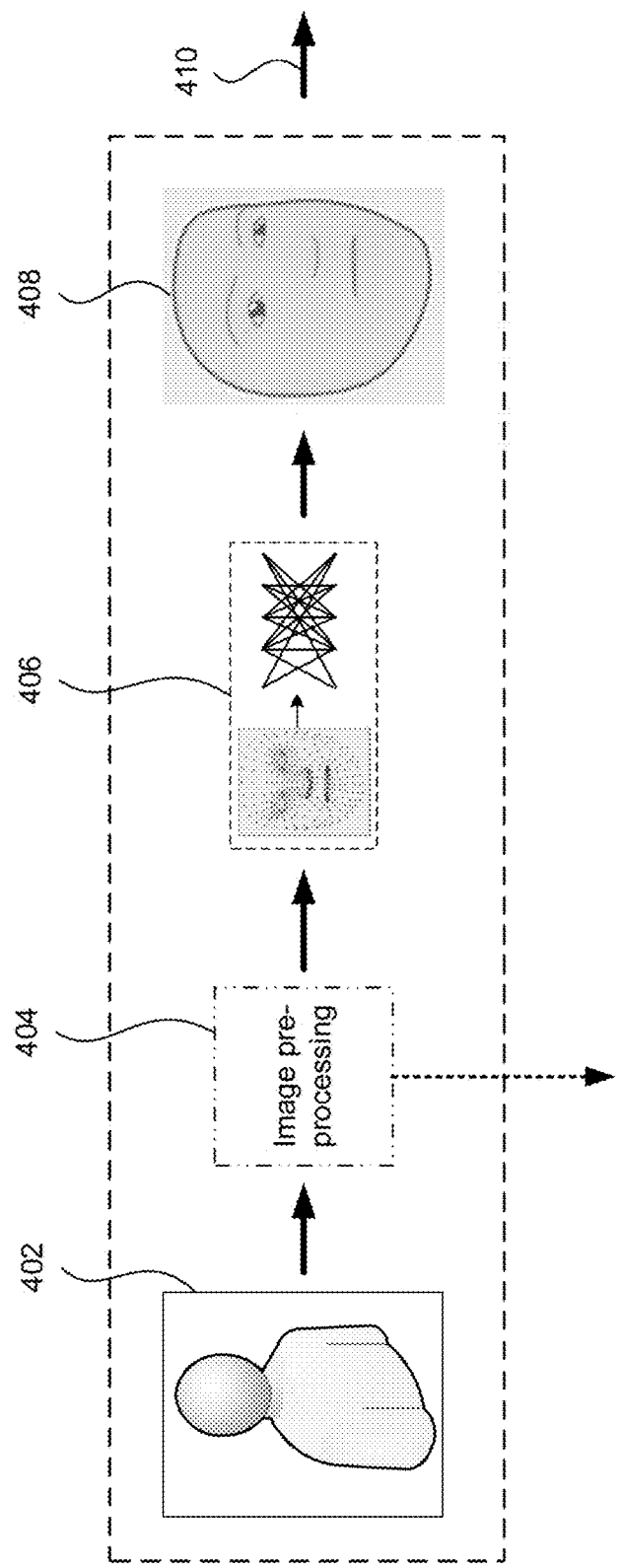

510

500

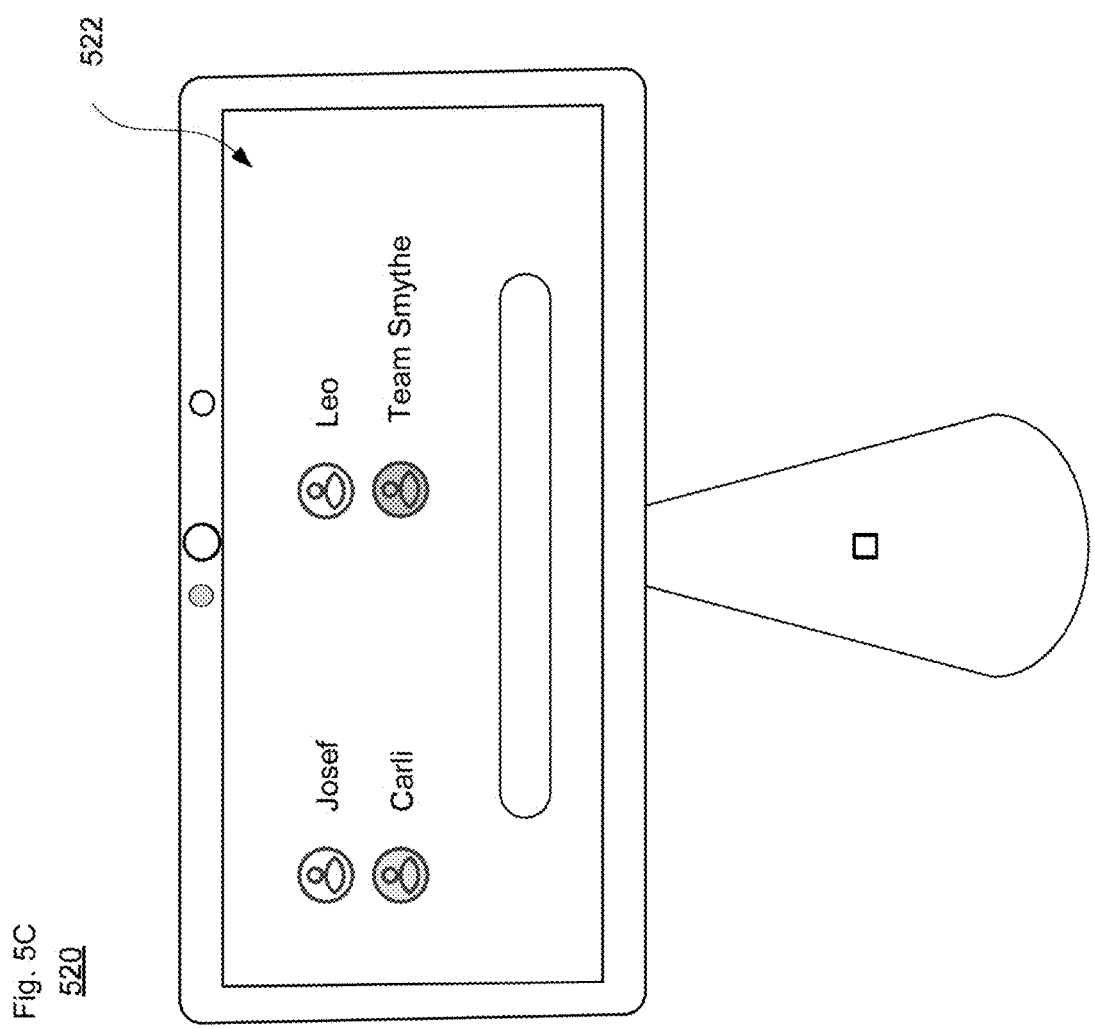

520

600

700

800

COMPUTER PLATFORM WITH SHARED USER EXPERIENCE INTERFACE

CROSS-REFERENCE TO RELATED APPLICATIONS

The present application claims the benefit of the filing date of U.S. Provisional Patent Application No. 63/324,302, filed Mar. 28, 2022, the entire disclosure of which is incorporated herein by reference.

BACKGROUND

People use client computing devices, such as laptops, tablets and netbooks in a variety of settings, including at home, school, their office, coffee shops, airports, etc. Different types of computing devices may be more suitable for specific settings, or geared for specific types of applications such as gaming or computationally intensive computer-aided design or drafting tools for work. In a home setting, a single shared computing device may be used by different household members for a variety of tasks beyond work or gaming, including streaming of movies or other content, schoolwork for children, etc. Unfortunately, in many instances such devices are not configured to adequately support the various tasks or to effectively interface with the different household members.

BRIEF SUMMARY

The technology relates to a computer platform that addresses technical problems involving in-home type use, in which a single platform is used to support the needs of different users while running different types of applications across a wide variety of scenarios. Aspects of the technology provide a technical solution as an all-in-one platform with the computer integrated within a monitor or other display device. The display device is affixed to a stand or other base, and may be rotatable relative to the base, e.g., between a horizontal (or landscape) display mode and a vertical (or portrait) display mode. In other words, the integrated housing is rotatably coupled to the stand, so that the display device is rotatable between a landscape mode and a portrait mode. Through presence sensing and other interface aspects involving situational awareness, the platform can provide a personalized experience to different individuals as well as common features according to a contextualized user interface. This provides a technical advantage of a single platform suitable for multiple users in many different situations without needed costly hardware or software add-ons. For instance, the computer platform can enhance family or other shared productivity, such as tasks that involve more than one person (e.g., homework assignments, group video chats, watching videos together) or any task that benefits the whole family even if performed by one person (e.g., family scheduling, group memos, looking up a recipe or paying a bill, etc.).

According to one aspect, a client computing device is provided which comprises an integrated housing that includes memory configured to store instructions and data for operation of the client computing device; a display module including a display device configured to present visual content; a user interface module operatively connected to the display module, the user interface module being configured to receive user input; a presence sensor module and a processing module. The presence sensor module is configured to detect presence of one or more people within a threshold distance from the client computing device. The presence sensor module includes an image sensor, wherein the presence sensor module is configured to implement one or more machine learning models to detect the presence of the one or more people in imagery taken by the image sensor. The processing module includes one or more processors. The processing module is operatively coupled to the memory, the display module, the user interface module and the presence sensor module. The one or more processors are configured to: determine, based on information from the presence sensor module, that at least one person has come within the threshold distance of the client computing device; evaluate a current presentation state of the display device; select, based on the evaluation and the determination that at least one person has come within the threshold distance, one or more items of content to present in an ambient visual display, the one or more items of content being associated with a shared account for the client computing device; and cause the display module to present the ambient visual display on the display device in accordance with the selected one or more items of content.

The shared account may include a plurality of individual user profiles for different users. The one or more items of content to present in the ambient visual display may include one or more selected from the group consisting of a shared calendar, a group memo and a to-do list. The one or more items of content presented in the ambient visual display may be modifiable by a person without logging into the client computing device. In one example, the threshold distance is a first threshold distance from the client computing device. Here, the presence sensor module is further configured to detect that a person has come within a second threshold distance from the client computing device that is closer than the first threshold distance, and the one or more processors are further configured to cause the display module to change from the ambient visual display to a user visual display based on the person coming within the second threshold distance. The change from the ambient visual display to the user visual display may include replacement of the ambient visual display with a log-in screen. The change from the ambient visual display to the user visual display may include modification of the ambient visual display to emphasize one or more particular content features.

The presence sensor module may further include another sensor configured to detect non-image information about whether a person is within the threshold distance of the client computing device. The other sensor may comprise one or more microphones configured to detect acoustic information within the threshold distance. The other sensor may comprise a radio frequency ultra-wideband sensor configured to detect a presence of another client computing device within the threshold distance. The ultra-wideband sensor may be configured to detect a pose of the other client computing device relative to the client computing device.

The client computing device may further comprise a stand, wherein the integrated housing is releasably coupled to the stand. The integrated housing may be rotatably coupled to the stand, so that the display device is rotatable between a landscape mode and a portrait mode. The client computing device may also include at least one orientation sensor configured to detect a change between the landscape and portrait modes. In one example, the display device includes a touch screen. Here, the client computing device may further include at least one of a keyboard or a mousepad, and the one or more processors are further configured to identify a likelihood of user input via either (i) the touch screen or (ii) the keyboard or mousepad and adapt operation based on the identification. The one or more processors may be configured to identify the likelihood based on the change between the landscape and portrait modes detected by the at least one orientation sensor.

In accordance with any of the above, upon a determination that no people have been detected by the presence sensor module within the threshold distance for at least a threshold amount of time, the one or more processors may be further configured to cause the display module to present a sleep mode screen on the display device. The one or more processors may be configured to select the one or more items of content based on whether a detected person within the threshold distance has a user profile with the client computing device.

According to another aspect, a computer-implemented method comprises detecting, by a presence sensor module of a client computing device, a presence of one or more people within a threshold distance from the client computing device; determining, by one or more processors of the presence sensor module based on the detection, that at least one person has come within the threshold distance of the client computing device; evaluating, by the one or more processors, a current presentation state of a display device of the client computing device; selecting, by the one or more processors based on the evaluating and the determining that at least one person has come within the threshold distance, one or more items of content to present in an ambient visual display, the one or more items of content being associated with a shared account for the client computing device; and causing a display module of the client computing device to present the ambient visual display on the display device in accordance with the selected one or more items of content. The shared account may include a plurality of individual user profiles for different users. The one or more items of content may include at least one user input item. The at least one user input item may be configured to be reformatted, rearranged or adjusted in response to user input. The one or more items of content to present in the ambient visual display may include one or more selected from the group consisting of a shared calendar, a group memo and a to-do list. Here, the one or more items of content presented in the ambient visual display may be modifiable by a person without logging into an account on the client computing device.

In one example, the threshold distance may be a first threshold distance from the client computing device. Here the method further includes: detecting, by the presence sensor module, that a person has come within a second threshold distance from the client computing device that is closer than the first threshold distance; and causing, by the one or more processors, the display module to change from the ambient visual display to a user visual display based on the person coming within the second threshold distance. The change from the ambient visual display to the user visual display may include replacing the ambient visual display with a log-in screen. The change from the ambient visual display to the user visual display may include modifying the ambient visual display to emphasize one or more particular content features. In this approach, the method may further comprise detecting that the person has come within a third threshold distance from the client computing device that is closer than the second threshold distance; and causing, by the one or more processors, the display module to change at least one feature of the user visual display based on the person coming within the third threshold distance.

The method may further comprise detecting, by at least one orientation sensor of the client computing device, a change of the display device between a landscape mode and a portrait mode. When the display device is touch sensitive the method may further include identifying, by the one or more processors, a likelihood of user input via either (i) the touch sensitive display device or (ii) a keyboard or a mousepad; and adapting operation based on the identifying. Identifying the likelihood may be based on the change between the landscape and portrait modes detected by the at least one orientation sensor.

The method may further comprise, upon a determination that no people have been detected within the threshold distance, causing, by the one or more processors, the display module to present a sleep mode screen on the display device. The one or more items of content may be selectable based on whether a detected person within the threshold distance has a user profile with the client computing device. The method may alternatively or additionally comprise: upon detecting the presence of the one or more people within the threshold distance from the client computing device, and upon determining that at least one person has come within the threshold distance of the client computing device, performing contactless user identification. Here, the contactless user identification may include facial recognition.

Selecting the one or more items of content to present in the ambient visual display may be based on an identification of multiple people having come within the threshold distance of the client computing device. In this case, the method may further comprise presenting group-specific information on the display upon one of the multiple people logging into the client computing device. Alternatively or additionally, the method may further comprise generating non-visual information upon determining that the at least one person has come within the threshold distance of the client computing device.

According to another aspect, a non-transitory computer program product comprises instructions that, when executed by one or more processors, cause performance of the method of any of the above.

According to yet another aspect, a computer-implemented method comprises: detecting, based on sensor data from a presence sensor of a client computing device, a presence within a threshold distance of the client computing device; applying, based on the detecting, one or more machine learning models to the sensor data to determine that at least one user has come within the threshold distance of the client computing device; selecting, based on the determining, one or more items of content to present in an ambient visual display, the one or more items of content being associated with a shared account for the client computing device; and displaying the ambient visual display with the selected one or more items of content to the user. The shared account may include a plurality of individual user profiles for different users.

These and other embodiments can each optionally include one or more of the following features.

Provided herein is a computer program product comprising instructions which, when executed by one or more processors, cause performance of any of the methods described herein. A non-transitory computer-readable medium comprising instructions which, when executed by one or more processors, cause performance of any of the methods described herein is also provided.

Provided herein is a method, comprising: detecting, based on sensor data from a presence sensor of a client computing device, a presence within a threshold distance of the client computing device; applying, based on the detecting, one or more machine learning models to the sensor data to determine that at least one user has come within the threshold distance of the client computing device; selecting, based on the determining, one or more items of content to present in an ambient visual display, the one or more items of content being associated with a family (or shared) account for the client computing device, wherein the family account includes a plurality of individual user profiles for different users; and displaying the ambient visual display with the selected one or more items of content to the user. A client computing device configured to perform the method is also provided, the client computing device comprising a presence sensor.

BRIEF DESCRIPTION OF THE DRAWINGS

FIGS. 1A-C illustrates examples involving presence sensing in accordance with aspects of the technology.

FIG. 4 illustrates an example scenario image evaluation by a presence sensor module for use with aspects of the technology.

FIGS. 5A-D illustrate example presence sensing scenarios in accordance with aspects of the technology.

DETAILED DESCRIPTION

Overview

Figure 1B:
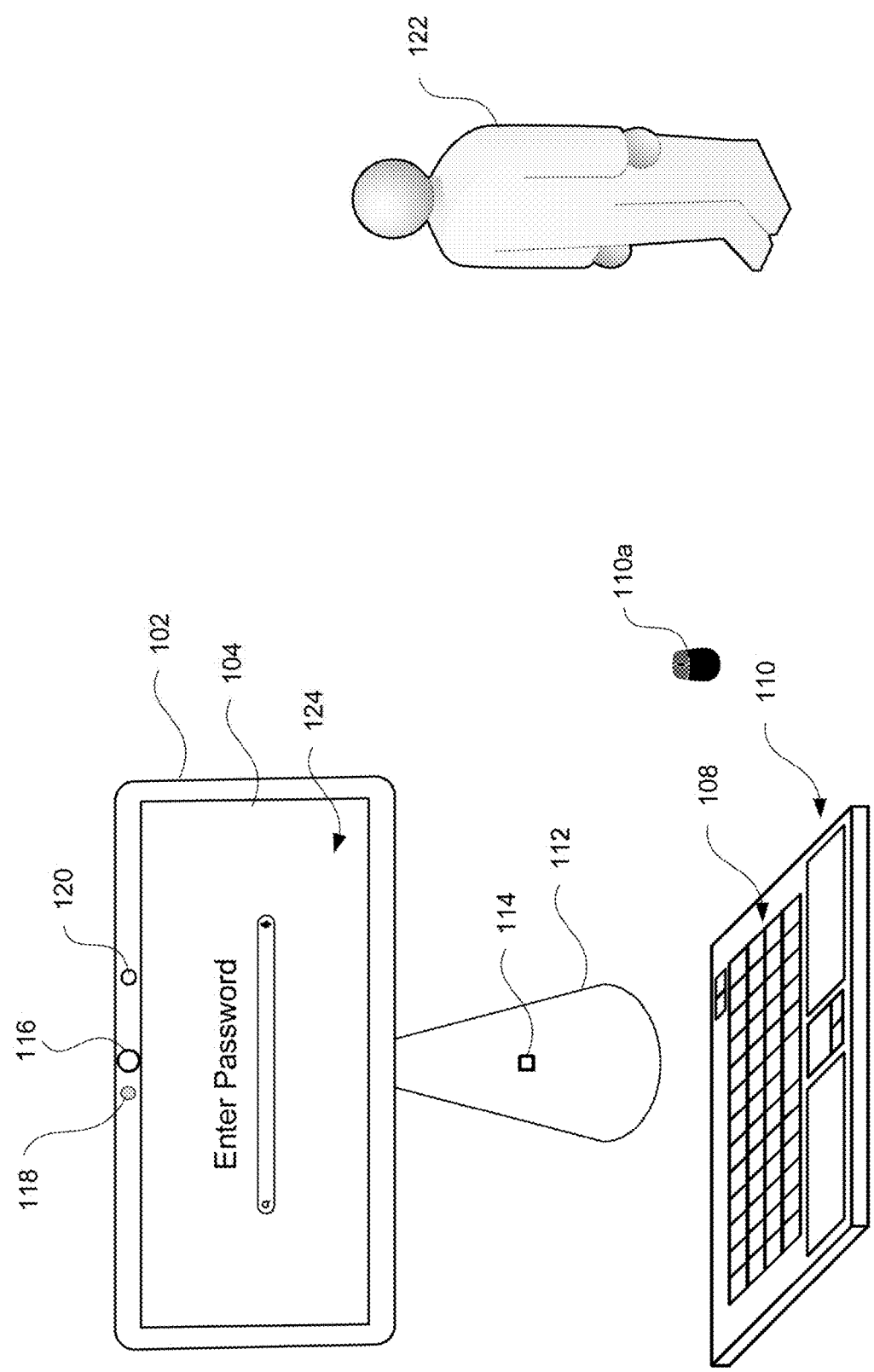

Every member of a household may have one or more computing devices that they use for specific tasks, such as streaming movies on a tablet, doing homework or work on a laptop, interfacing with social media on a mobile phone or smartwatch, etc. However, individual devices may not interoperate and can compete for the same resources, such as WiFi bandwidth. They are also often associated with only one user (for example, with one user profile), which means that certain communal interactions among the household members can be difficult or impossible to achieve with such devices. For instance, this can involve complexities across account sharing, friction in logging in, and data that is shared across accounts within the same device. In contrast, an integrated all-in-one platform such as those discussed herein can readily address technical problems including competition for resources, poor device interoperability and lack of communal interaction while still enabling a personalized experience.

A general architecture is discussed, and specific features that provide the corresponding technical solutions for different types of situations are explored. This includes a unified desktop experience based on presence, a shared family space as part of an ambient visual display, which can easily transition to a personalized experience for each household member, as well as seamless switching involving user interface elements when the display device is rotatable. Initial examples of these are shown, followed by additional exploration of the features.

According to one aspect of the technology, a presence sensor is able to detect whether a person is at or near an integrated computing device. This can be done using a dedicated presence sensor separate from the rest of the processing system or one that is integrated with a built-in webcam or other integrated camera unit. The presence sensor can capture imagery, as well as non-image information such as sound, heat, radiative information and/or other information suitable for determining presence of a person and evaluate it by, e.g., one or more machine learning (ML) models to identify whether one or more people are with viewing range of the presence sensor or within close reach to the device. When at least one person is identified, the integrated computing device can surface specific information based on the current context, enabling the person(s) to interact with the device in selected ways. Thus, the computing device can evaluate a current presentation state of the display device and select, based on the evaluation, one or more items of content to present to the person(s). The one or more items of content may include at least one user input item. Byway of example, the at least one user input item may be configured to be reformatted, rearranged or adjusted in response to user input, for instance to move around on the display, change the size or configuration, etc. The current presentation state can include content currently being displayed, other current context signals (date, time of day, calendar information, etc.), or any other information associated with the state of the device, such as whether the device is locked or logged-in, for example.

FIG. 1A illustrates an example 100 showing an integrated client computing device 102, which may be used as a household computer. In this example, display 104 is displaying a screen saver 106 because the client device is not actively being used. Display 104 may have an aspect ratio such as 16:9, 4:3 or a different ratio. The display may have a diagonal size of, e.g., 19 inches, 21 inches, 24 inches or more or less. The display may be configured for tactile input using a stylus or touch input with the user's finger(s). As shown, the integrated client device may employ a wireless keyboard 108 and/or one or more trackpads or mousepads 110, which may be part of one unit or the keyboard may be separate from the trackpad/mousepad or a mouse-based input 110a. The integrated client device has a stand 112. One or more microphones 114 may be disposed along the stand and/or disposed along the housing of the integrated client device 102. While the integrated client device may be fixedly mounted to the stand 112, in an alternative configuration the screen (with the integrated components) can be detached from the stand, allowing a user to carry around the home and use remotely based on battery power. In other words, the client device can comprise an integrated housing that is (optionally removably or releasably) coupled to the stand 112.

A webcam or other integrated camera 116 that may include a privacy shutter or other feature to disable image-taking is positioned along the housing of the integrated client device 102, which can be used for videoconferences, interactive gaming, etc. Indicator 118, such as an LED, may be illuminated to alert a user whenever the webcam 116 is in use. The integrated client device may include a separate camera or other imaging device 120 that is part of a presence sensor. As shown, the webcam 116 and the imaging device 120 may each be positioned along a top bezel of the integrated client device housing. In some examples these devices may be located in different position along the integrated housing. The integrated camera 116 may be used as part of the presence sensor instead of or in addition to imaging device 120. In other words, the presence sensor comprises an image sensor configured to take one or more images. The presence sensor can be configured to detect presence of one or more people within a threshold distance from the client computing device. For example, the presence sensor includes the image sensor, as discussed herein, and the client device is configured to detect the presence of one or more people in imagery (images) taken by the image sensor.

In the example shown in FIG. 1B, a person 122 enters the room (or environment) where the integrated client device is located. When the person comes within detection range of the imaging device or image sensor (which can be the webcam or a dedicated presence sensor), within the imaging device's field of view and within some (first) threshold distance from the integrated client device (e.g., within 2-5 meters from the integrated client device), the presence sensor unit or module evaluates one or more images obtained by the imaging device (such as according to one or more ML models implemented by a processing module of the presence sensor). The threshold distance can be a predetermined threshold distance, and can be a fixed threshold, or can be modifiable/configurable by a user based on one or more preferences.

Then upon determination that a person is present, the presence sensor causes the operating system of the integrated client device to wake up the device. This can include changing from the screen saver in a sleep mode to an information screen 124 in a wake on approach mode. A sleep mode can be any low power mode of the display of the client device, such as where the screen is dark or darkened, or where a majority of the display device pixels are not being driven (are off, or dark), for example. In such a mode, power consumption of the device is reduced as compared to a fully on or wake mode. By waking the device on approach in the manner described herein, resources of the client device may be further conserved by not activating the display when there is no-one near the device. As shown in this example, the information screen 124 may be a login screen, although other types of information may be presented, such as a shared (e.g., family) calendar 126 as shown in FIG. 1C, a group memo or to-do list, etc. These types of information are surfaced to the (ambient) information screen (or ambient visual display), which allows for asynchronous family scheduling with increased visibility to any family member. In addition to presenting visual information on the display, the system may also generate non-visual information upon determining that the at least one person has come within some threshold distance of the client computing device. This can include playing a tone, tune or other sound via the speaker(s) of the client device. Alternatively or additionally, this can include illuminating or changing the illumination status of one or more peripheral devices, such as a keyboard or mouse.

For example, the content displayed in the ambient visual display, when a person comes within the threshold distance of the client device, is content associated with a family (or group) account for the client device. In one scenario, when a user is nearby but not within arm's reach of the integrated client device (e.g., not within 3-4 feet), the display may show the calendar or another interesting ambient screen (ambient visual display) so that the device is useful in mid-range distances. Then, when the user is within a second threshold distance, for example in close range (e.g., arm's reach within 3-4 feet) the system can dismiss the ambient screen/screensaver and surface a log-in screen in its place. Here, with a biometric login, this can create a very streamlined login experience. The log-in screen can be an example of a user visual display (is user orientated or user specific, as compared to a generic or family orientated ambient visual display). Conversely, as the person walks away from the integrated client device, the presence sensor may cause the user interface to save or close out of active applications, present a lock screen, return to the ambient visual display, put the device into a sleep mode, etc. Here, this can include determination by the presence sensor that no people have been detected within some threshold distance (e.g., more than 3-5 meters) for at least a threshold amount of time (e.g., 1 minute or more).

Figure 1D:
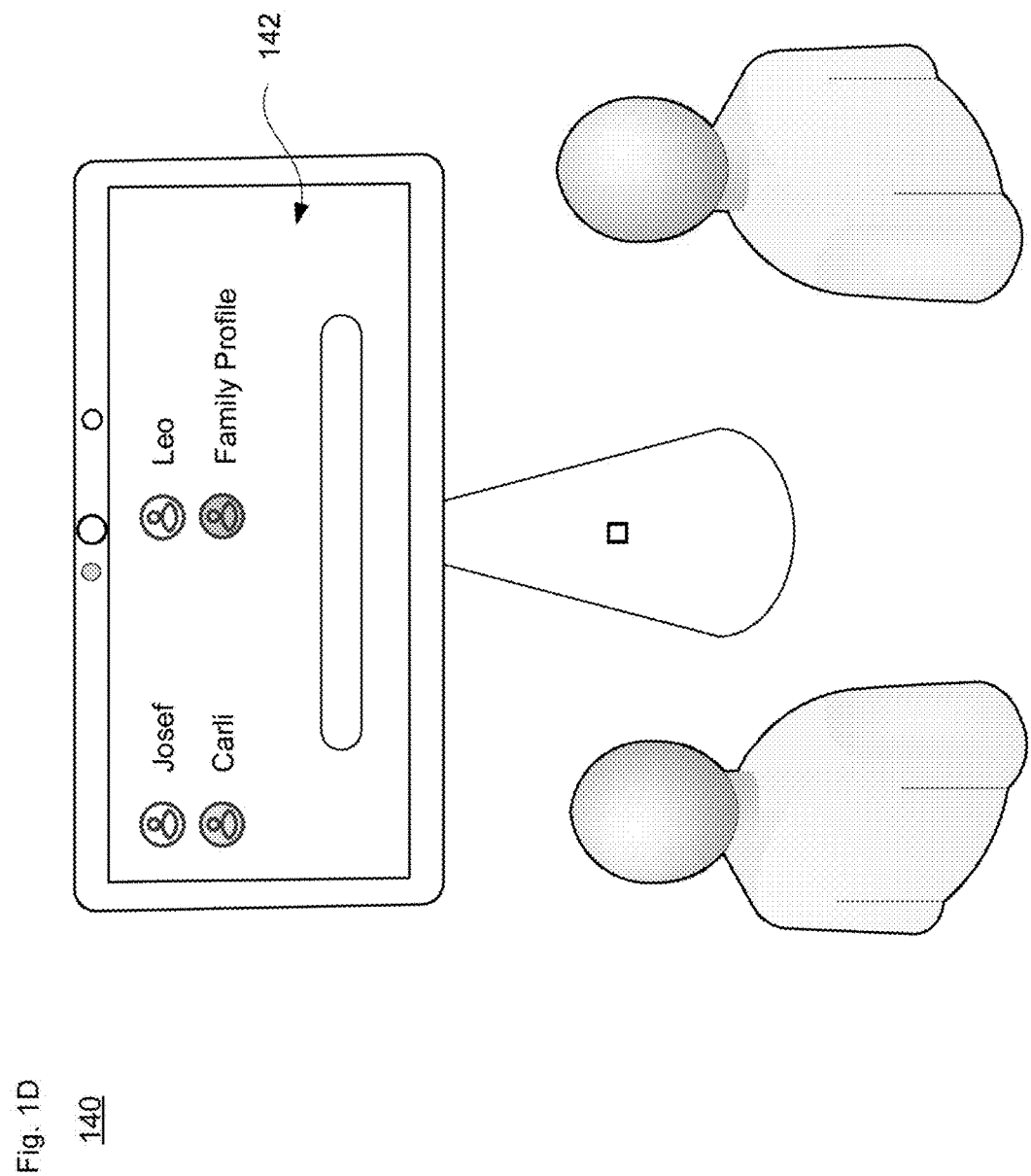
FIGS. 1D-F illustrates examples involving shared content in accordance with aspects of the technology.
Figure 1E:
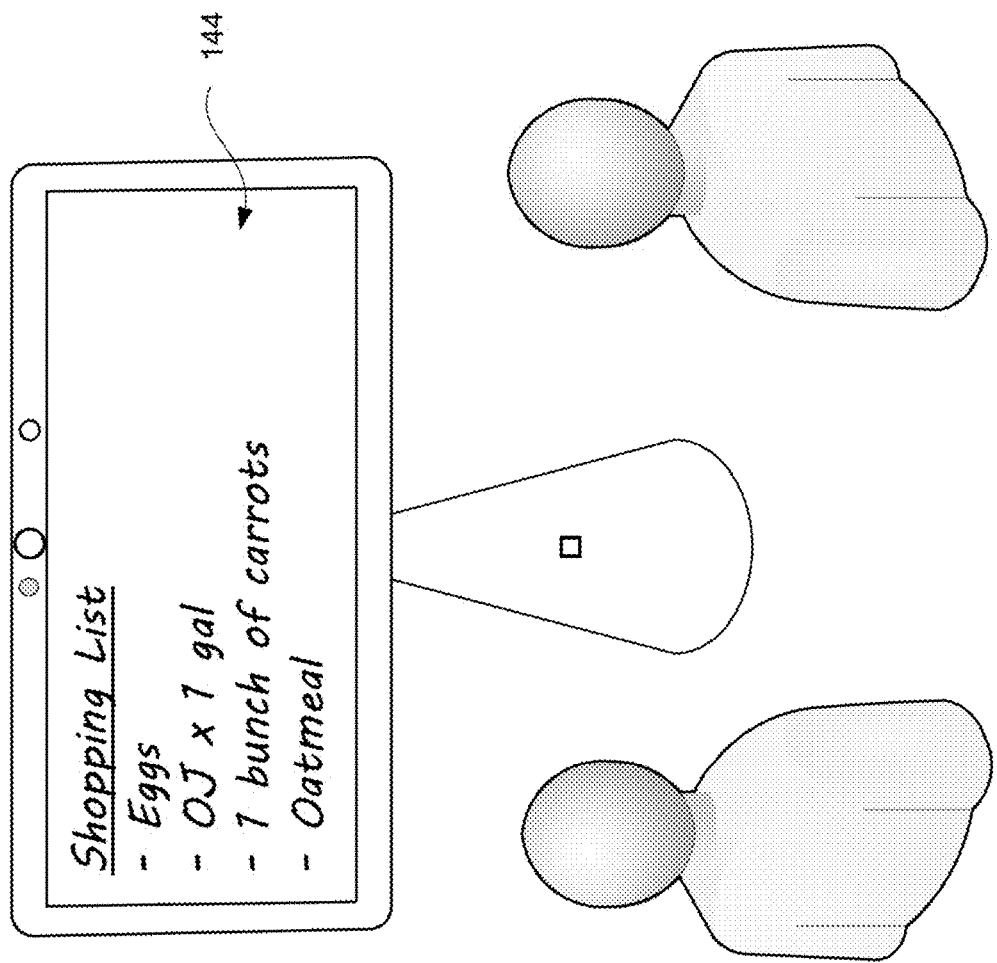
Figure 1F:
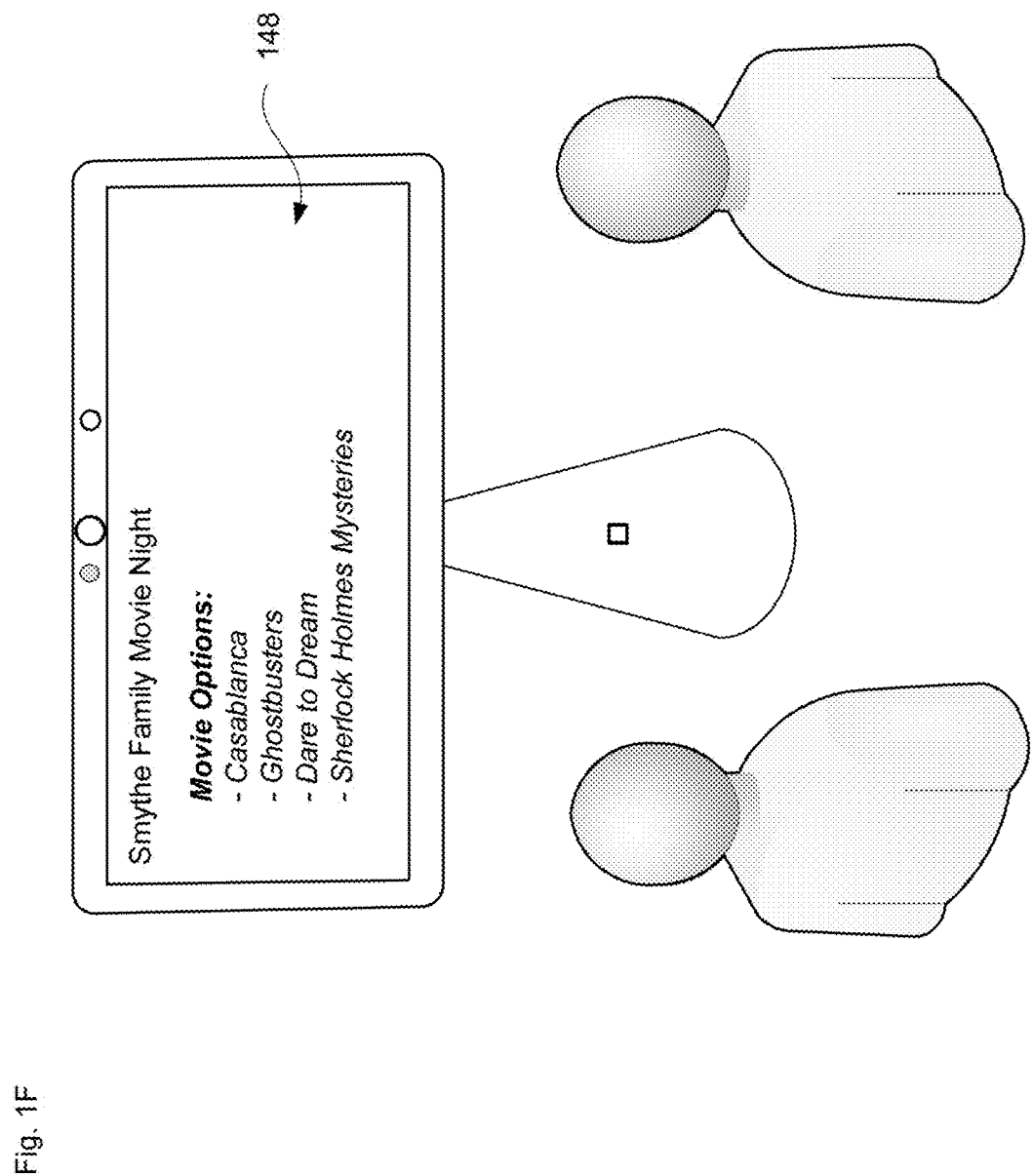

FIG. 1D illustrates another scenario 140 regarding a shared family space. Here, the user interface presents a login 142, that may include separate accounts for each family member (a plurality of individual user profiles for different users) as well as a common or shared account for the family (a common family or shared account). The individual user profiles can be embedded into or otherwise associated with the family account such that the family account includes the plurality of individual user profiles. If a person logs in as an individual, their user experience can be tailored to that individual's preferences, including which apps are available, how they are presented, preferences associated with the apps, etc. The family account may be associated with a set of common apps or other features which can be surfaced in the UI when logged in under the family account. This can include a common calendar (see 126 in FIG. 1C), a shopping list 144 as shown in FIG. 1E, a set of movie options 146 available for streaming as shown in FIG. 1F and/or other shared information. In an alternative, even when logged in as an individual, the user interface may still present some or all of the common family information. In one example, the common account may be utilized by multiple family members. In another example, the common account may be shared by roommates, suitemates or officemates, e.g., in a dormitory, school or office setting.

Figure 1H:
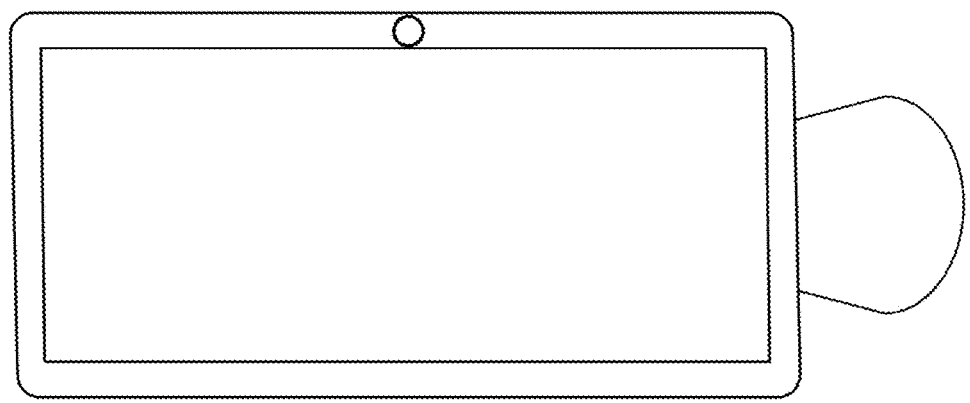
FIGS. 1G-H illustrate examples of an adaptive UI based on display orientation in accordance with aspects of the technology.
Figure 1G:
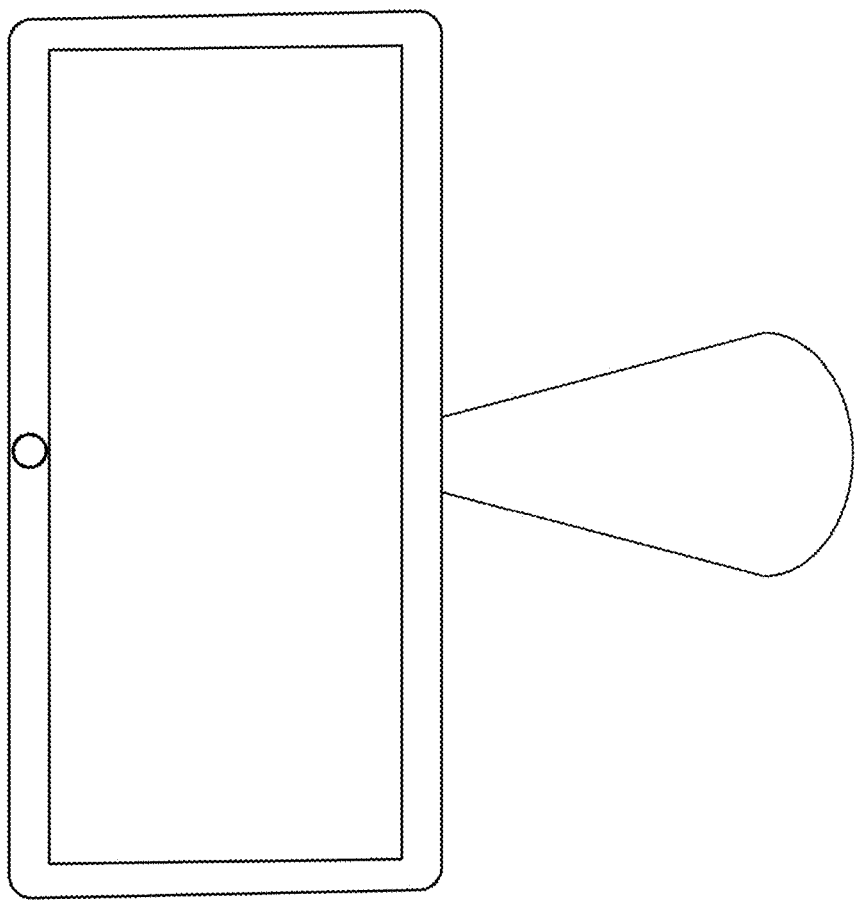

As noted above, according to another aspect the display device may be rotatable, e.g., between a horizontal (or landscape) display mode and a vertical (or portrait) display mode, as shown in views 160 and 170 of FIGS. 1G and 1H, respectively. Depending on the display mode, the user(s) may interact with the integrated client device in different ways. For instance, in landscape mode, the user may work on a spreadsheet or write a term paper. In this case, the interaction with the device may be focused on input via the keyboard and/or mouse. However, when the screen is rotated into portrait mode and the user is running a paint or computer aided design app, the interaction may be primarily touch-based. Thus, according to one aspect, display orientation, usage patterns, application usability and/or other factors, the system may anticipate user action according to a specific input type (or identify a likelihood of user input via a specific input type) and adapt the user interface accordingly to facilitate more robust engagement with the system.

Integrated System Architecture

Figure 2:
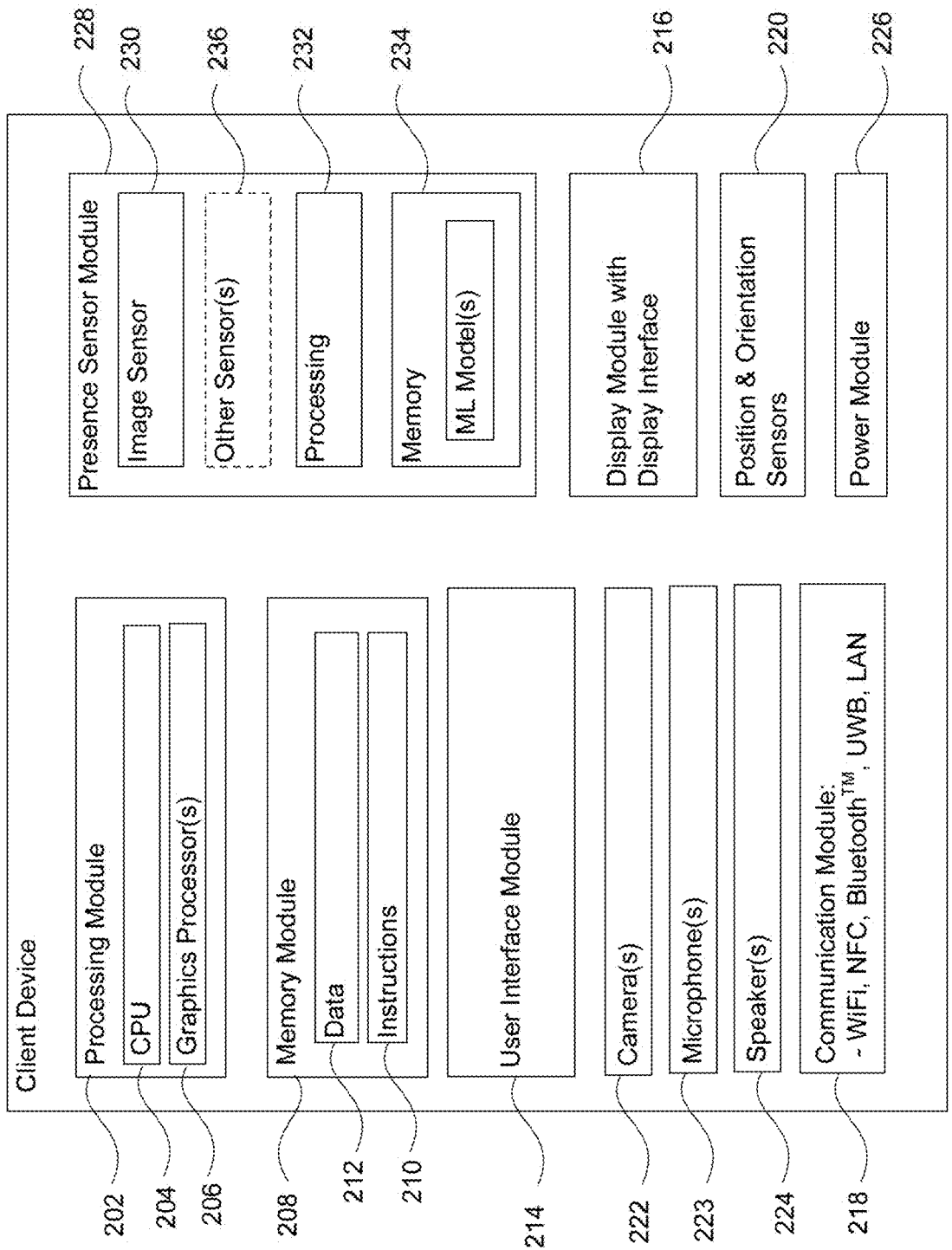
FIG. 2 illustrates a block diagram of an example integrated client device in accordance with aspects of the technology.

FIG. 2 illustrates a block diagram of an example integrated client device 200, such as a desktop-type client computer. As shown, the client device includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 via the user interface module. For instance, during different modes at different times or in different situations, the user interface module may cause the display device to present a screen saver, an ambient visual display based on user presence, a login screen, as well as apps and other features. The display module 216 has a display interface and may be configured as a touchscreen that enables user input via a stylus or other tool, or by the user physically touching the screen.

As noted above regarding FIGS. 1A-H the integrated client device 200 may include a base (or other stand) and a display housing. According to an aspect of the technology, the display housing incudes the display module and may include the processing and memory modules along with some or all of the other components shown in FIG. 2. In one example, the power module 226 may include a battery to power the integrated client device when the display housing including the other components is physically removed from the base for portable use. When connected to the base or other stand, the display module 216 may be configured to pivot, pan, swivel and/or rotate relative to the base. For instance, the display module 216 may rotate between a horizontal (landscape) orientation and a vertical (portrait) orientation as shown in FIGS. 1G-H.

User interface module 214 is configured to receive user input. User interface module 214 may receive commands from a user via user inputs and convert them for submission to a given processor. The user interface module may link to a web browser (not shown). The user inputs may include a touchscreen as noted above, in addition to or alternatively from a keyboard, keypad, mousepad and/or touchpad, microphone, gesture-based input or other types of input devices. The keyboard, keypad, mousepad and/or touchpad may be part of or connectable to the base via a cable or other wired connection, or may physically separate from the integrated client device and configured to connect via one or more wireless connections such as Bluetooth™, WiFi, ultra-wideband (UWB), infrared, etc. The user interface module 214 can be operatively connected to the display module 216.

The display module 216 may comprise circuitry for driving the display device to present graphical and other information to the user. In other words, the display device is configured to present visual content. By way of example, the graphical information may be generated by the graphics processor(s) 206, while CPU 204 manages overall operation of the integrated client device 200. The graphical information may display responses to user queries on the display module 216. For instance, the processing module may run a browser application or other service using instructions and data stored in memory module 208, and present information associated with the browser application or other service to the user via the display module 216. The memory module may include a database or other storage for browser information, location information, etc.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively, the memory module 208 may also include removable media (e.g., DVD, CD-ROM or USB thumb drive). One or more regions of the memory module 208 may be write-capable while other regions may comprise read-only (or otherwise write-protected) memories. In one implementation, a computer program product is tangibly embodied in an information carrier. Although FIG. 2 functionally illustrates the processor(s), memory module, and other elements of integrated client device as being within the same overall block, such components may or may not be stored within the same physical housing. For example, some or all of the instructions and data may be stored on an information carrier that is a removable storage medium connectable to the base or the display housing (e.g., optical drive, high-density tape drive or USB drive) and others stored within a read-only computer chip which is integrated into the base or the display housing.

The data 212 may be retrieved, stored or modified by the processors in accordance with the instructions 210. For instance, the data may be stored in computing device registers, in a relational database as a table having a plurality of different fields and records, XML documents or flat files. The data may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance.

As also shown in FIG. 2, the integrated client device 200 includes a communication module 218 for communicating with other devices and systems, including other client devices, servers and databases. The communication module 218 includes a wireless transceiver; alternatively, the module may alternatively or additionally include a wired transceiver. The integrated client device 200 may communicate with other remote devices via the communication module 218 using various configurations and protocols, including short range communication protocols such as near-field communication (NFC), Bluetooth™, Bluetooth™ Low Energy (BLE), UWB or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the example device as shown includes one or more position and orientation sensors 220. The position and orientation sensors 220 are configured to determine the position and orientation of one or more parts of the integrated computing device 200, such as the display housing relative to the base. For example, these components may include a GPS receiver to estimate the integrated client device's latitude, longitude and/or altitude, as well as an accelerometer, gyroscope or another direction/speed detection device such as an inertial measurement unit (IMU) capable of determining the orientation of the display housing relative to the base (as well as the rate of change of the positioning of the display housing). The integrated client device 200 may also include one or more camera(s) 222 for capturing still images and recording video streams such as an integrated webcam and/or a dedicated imaging device for presence sensing as discussed above. The device may also include one or more microphones 223 (which can also be used for presence sensing, e.g., by detecting acoustic information within the threshold distance from the client device), speakers 224, as well as a power module 226. Actuators to provide tactile feedback or other information to the user may be incorporated into the touchscreen of the display module (not shown).

While the integrated computing device 200 may perform presence sensing using an integrated camera, in some configurations the device may include a separate presence sensor module 228. The presence sensor module 228 can be configured to detect a presence of one or more people within a threshold distance from the computing device 200. As shown, this module includes an image sensor 230, a processing module 232 and a memory module 234. In one example, the image sensor can a dedicated low resolution camera that may provide greyscale or color (e.g., RGB) imagery that has a size (in pixels) of 320×240, 300×300 or similar size (e.g., +/−20%). During operation, imagery may be taken by the image sensor 230 (or the webcam) once every 2-10 seconds (or more or less). The presence sensor module can be configured to implement one or more machine learning (ML) models to detect the presence of the one or more people in imagery taken by the image sensor 230. The processing module may comprise an FPGA or other processing device capable of processing imagery received from the image sensor in real time using one or more ML models. The models themselves can be stored in the memory module 234 or the main memory 208 of the device 200.

The presence sensor module 228 may be configured to operate using as little power as possible, for instance on the order of 100 mW or less. In one scenario, the module 228 may use 5-10 mW in a "Wake on Approach" mode (such as in the example of FIGS. 1A-B). This may be achieved by turning off the processing module 232 while its usage is not required. Here, by way of example, the module 228 may either rely on movement detection incorporated into the image sensor to wake up the processing module 232 or by starting the processing module 232 approximately once every 1-15 seconds to check whether it is needed. Imagery obtained by the image sensor for presence sensing may not be stored in memory after processing. Regardless of whether any imagery is maintained by the presence sensor module, it may not be transmitted to another part of the device for use as imagery for the webcam.

Figure 3:
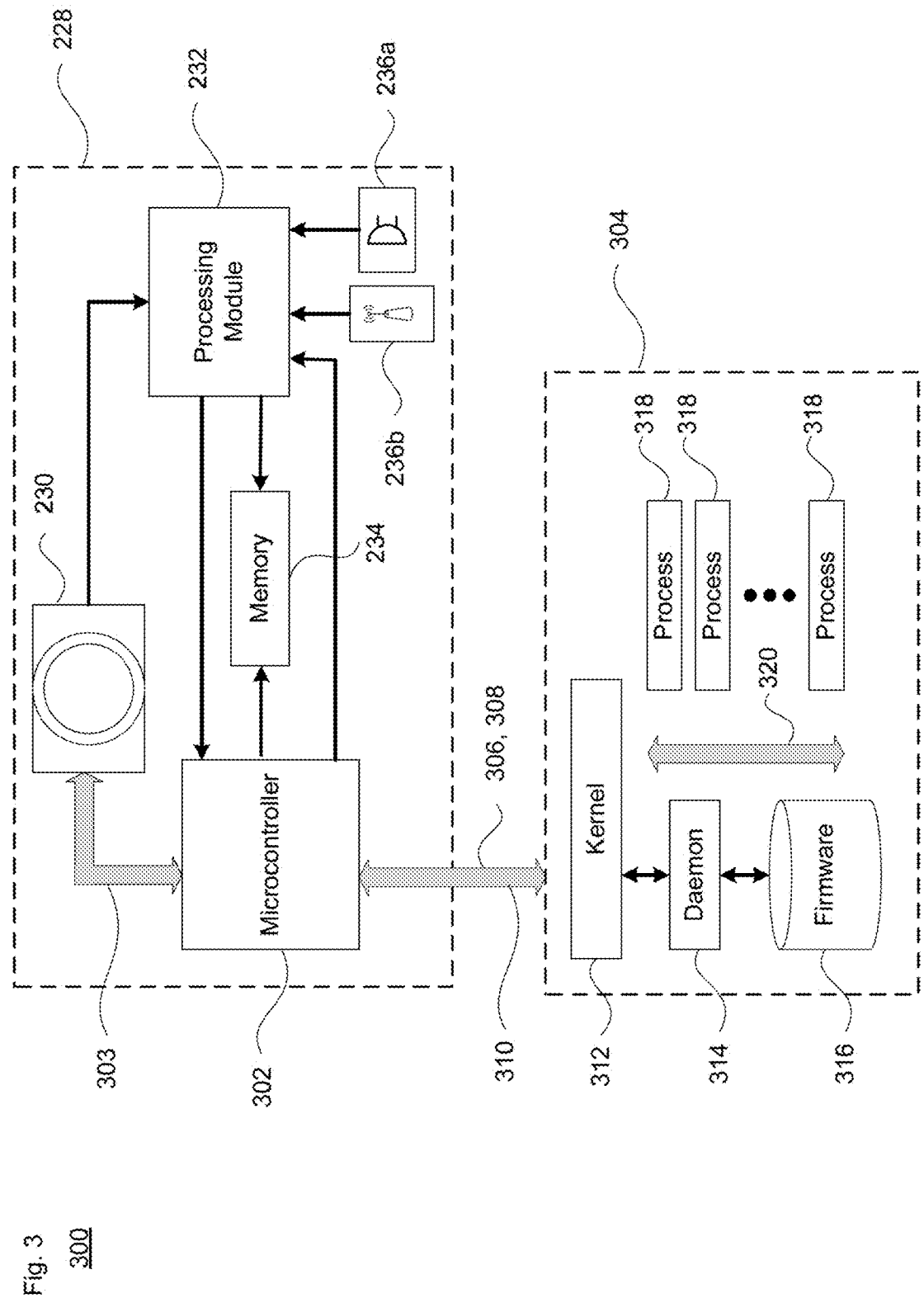
FIG. 3 illustrates a functional diagram of an example client device in accordance with aspects of the technology.

FIG. 3 illustrates an example 300 of the logical architecture of the integrated client device 200 with the presence sensor module 228.

As shown, a controller 302 of the presence sensor module 228 may be operatively connected to the image sensor 230, processing module 232 and memory module 234. One or more other types of sensors 236 (e.g., microphones for audio or acoustic sensing, or a radio frequency UWB sensor configured to detect nearby client devices) may also be provided. The controller 302 can be configured to turn the processing module 232 and the memory module 234 on and off, and can update the memory as needed, such as to add new ML models or update existing models. The controller 302 may couple to the image sensor via an 12C interface 303, while it may couple to the processing and/or memory modules via an SPI interface. The controller 302 may be responsible for managing power states and communicating configuration and status from and to the integrated client device operating system.

The image sensor of the presence sensor module (or the integrated camera of the computer) is configured to output imagery to the processing module 232 and may send motion detection information, but not imagery, to the controller 302.

As noted above, other (non-image) sensors 236 may be incorporated into the presence sensor module 228. By way of example, this can include a microphone (or microphone array) 236a and/or a UWB sensor 236b. The microphone(s) can pick up sound, while the UWB sensor can detect the presence of other nearby UWB-enabled computing devices. For the latter, by way of example the UWB sensor can be used to identify how far another UWB enabled device (e.g., a mobile phone or a tablet computer) is from the integrated client device, as well as a pose of the other device, such as at what relative angle the other device is oriented, and how that device is currently tilted (e.g., whether the other device is pointing toward the integrated client device like remote control). The information from the sensor 236a and/or 236b may be synthesized with the image-based information to, e.g., validate the image information or otherwise confirm the presence of a particular individual.

For instance, the presence sensor module may default to a very low power state in which it is just looking for motion (and/or sound or the presence of another UWB-enabled device). The presence sensor module can be configured to initially detect presence of one or more people within a threshold distance from the device. When presence/motion is detected by the image sensor (or other presence information is received), the other components of the presence sensor module 228 can then power up to determine if there is a person nearby. For example, after initial motion (or presence) detection, the processing module 232 of the presence sensor can be configured to apply or implement one or more machine learning models to detect the presence of one or more people in imagery taken by the image sensor. In other words, the processing module 232 will start doing presence detection to see if the device should be woken up fully.

If it is determined that there is not a person nearby (the initial presence sensing was erroneous, or was not caused by a person, for example), then the system can go back to low power motion sensing. Otherwise, the processing model of the client computing device can determine, based on information from the presence sensor module, that at least one person has come (is) within the threshold distance of the client computing device. This two-step approach to detection of at least one person within the threshold distance of the client computing device can help to conserve computational resources. The processing module 232 may temporarily store data in the local memory when running the one or more ML models on the received imagery. Once processed, the processing module 232 is configured to send commands and/or data to the controller 302. By way of example, commands sent to the microcontroller can include: (1) Person Detected; (2) No Person Detected; or Second (or additional) Person Detected, etc. These commands can be forwarded to the operating system of the integrated client device with minimal additional processing.

As shown, the controller 302 is operatively coupled to an operating system 304 of the integrated client device. For instance, this may be done using an I2C or SPI bus interface. Via this interface, the controller 302 can issue interrupts 306 or send commands, results or other signals 308 via a bus 310, which may be used by the operating system, a specific app or program (e.g., a login app, a family welcome screen or a videoconference program) or other part of the integrated client device to take some action upon determination that there are one or more people in view of the imaging device of the presence sensor (or have been detected via the other sensors of the presence sensor). By way of example, interrupts can indicate that a person is present or some other condition in the environment detectable by the presence sensor module. An interrupt can be used to wake the computing device from a suspend or standby mode, e.g., to initiate face authentication or to display information such as family notifications, a shared calendar or the local weather. Thus, one general mode of operation is for the presence sensor module to send the results of inferences of one or more models executed by the local processing to the operating system, and to allow one or more processes of the operating system to interpret those results and respond or otherwise proceed accordingly.

The operating system may logically include, as shown, a kernel 312, a presence sensor daemon 314, firmware 316 and one or more routines or other processes 318 such as to control power to the display device or other devices. In this example, the presence sensor daemon 314 is a software daemon responsible for coordinating communication between the presence sensor module 228 with the processes 318. The kernel may communicate with the routines or other processes via a system bus 320, such as a d-bus, for inter-process communication.

Presence Sensing

According to an aspect of the technology, for presence sensing the system may employ one or more ML models, which are stored in memory. By way of example, the models may include one model for detecting whether any person is present and another model for detecting whether there are any other people in the vicinity. The identification of multiple people may trigger the operating system or a specific program running on the integrated client device to present certain family-related information on the user interface (e.g., a shared calendar, shopping list, chores list, etc.) or to include specific family-related information when an individual logs into the device.

The models implemented in the presence sensor module are configured to detect human faces and/or other parts of a person in images. For example, the head might be mostly above the screen, but the person's torso, arm or other portion of their body might be visible. Thus, while a cat or other pet may approach the client device, the models are designed so that the system does not react to such non-human presence. In some examples, when at least one person is detected as having come within (detected as being within) a threshold distance of the client computing device, the content presented in the ambient display can be content associated with a family account for the client computing device. However, in some implementations, identification of a person can include determining whether one or more faces are "registered" with the integrated client device. In one scenario, in addition to face detection, the system may be configured to perform facial recognition. Here, one or more models can be trained according to specific household members. Thus, in an example, the system may present certain family-related information (e.g., a calendar indicating upcoming doctor appointments or dental visits) in the ambient visual display upon confirmation that the person(s) is/are registered, while if one or more people are not registered the ambient visual display may not surface the family-related information (e.g., instead displaying a generic weekly calendar or a clock). In other words, content associated with a family account for the client computing device is presented in the ambient visual display only when a detected person is registered as part of the household/family.

In one scenario, the model(s) can reliably detect faces up to about 2-3 meters away from the camera with approximately a 10-pixel face width. In this scenario, the model(s) may also meet the following requirements. First, be able to work on grayscale (or color) images having an aspect ratio such as 320×240 or 300×300. Each model may employ, by way of example, a convolutional neural network (CNN), recurrent neural network (RNN), long short-term memory (LSTM) network or combination thereof.

In one scenario, the model training may include one or more types of image augmentation to help generate robust models. This can include scaling face size (e.g., to help identify children and adults or identify whether someone is near or far), translate faces, clip faces, synthesize multi-face images, and/or blur out selected face details. In a baseline set of imagery, before training any images without faces can be discarded. Then according to one example, do one or both of the following: (i) select the largest face in the image set and scale it such that the height of the face is up to 110% of the image height, and (ii) move the face to a random location in the image. In this case, at least 60-80% of the image should be visible on screen (not clipped at the edges). If padding is required for the image due to the translation, one can either repeat the last row/column, or reflect the image to fill (being careful not to remove/reflect other faces). The training may also involve adding a "synthetic" second person. Here, two images containing faces are chosen. One of the faces is then smoothly blended into the other image. This could incorporate a region that includes part of the body as well. The blend should look as realistic as possible so the ML model cannot learn that images with blended faces are always a second person. Faces may also be blended into images without any faces in them to help with this as well.

FIG. 4 illustrates an example scenario 400 for image evaluation by the presence sensor module in view of the above. At block 402 the image sensor captures an image, which may be a greyscale or color image. The image may be on the size of, e.g., 320×240 or 300×300, or a similar size, and may be of moderate or low resolution. Next, at block 404 one or more pre-processing operations may be performed by the image sensor or by the processing module. For instance, the image sensor or processing module may make adjustments to the image exposure, gain (analog and/or digital gain) or other image parameters, crop the image, convert from a color (e.g., RGB) image to a greyscale image if the image sensor generates color imagery (e.g., an image sensor having a Bayer filter), etc. Preprocessing may additionally or alternatively include detecting when images are unusable (e.g., all black or fully saturated).

Image pre-processing can additionally or alternatively include the image sensor extracting motion information from the image, e.g., based on a comparison of the image pixels to those of one or more images taken immediately prior to the current image. Here, the extracted motion information can be sent to the controller as indicated by the dotted downward arrow from the image pre-processing block 404. Note that image sensor parameters, such as to account for different lighting conditions, may be calibrated at initial setup (e.g., each time the human presence sensor module is turned on or each time the image sensor is initialized), and may also be adjusted in between image captures. For instance, during a first image capture there may be no one in the room and the lights are off. However, when a person enters the room and turns on the lights, this could necessitate adjustment to the exposure or other parameters. The image capturing process itself may occur continuously every X milliseconds, such as every 100-500 milliseconds (or more or less), so long as the presence sensor module is operating. Here, operation of the module may involve the user of the integrated client device affirmatively granting permission.

At block 406 the local processing applies the one or more ML models to the raw or pre-processed image. The models are maintained in local memory and during processing data is temporarily stored in, e.g., RAM, of the memory module. In addition to detecting the presence (or absence) of one or more people in an image, there may be one or more models configured to detect human faces or other parts of a person such as a torso, arm, hand, leg etc. Another model may be trained to detect people wearing masks, or who's faces are otherwise partly obscured (such as when a person is not directly facing the image sensor. As shown by block 408, output from the applied models may be an indication that one or more people are present. And as shown by arrow 410, an interrupt, commands, result or other signal may be issued by the local processing and/or the module controller so that the operating system or other part of the client device may perform one or more actions in response to the presence detection.

Example Scenarios and Applications

In recent years, in-home computing has become much more relevant and prevalent for both work and school. The experience of how people access their computer, how to get to what point they want simply and quickly, and how to ensure the device feels personalized and relevant to each person, is becoming increasingly more important. Such issues have not been adequately addressed previously in many instances for a desktop-type system in the home, particularly for families where each individual has specific computing needs that are often different from others in the household.

Technical solutions to this include aspects involving shareability, context and continuity. Shareability provides a suitable multi-user experience for the entire family or other household. For instance, the integrated client device may sit in the living room or other common space where all household members can use it. Context enables the computing system to provide situation or scenario-specific information to the user(s), helping to tailor user interface interactions and enable helpful transitions. Continuity allows the integrated client computer device to seamlessly transition content and interactions with other user device, such as a television in the same room for streaming movies, mobile phones or tablets to share video clips, home appliances to present recipes or control other devices such as a thermostat, etc. Thus, content may be cast to or from another device for an optimized user experience, such as casting a movie onto a high definition big screen television from the integrated client device, posting a video clip from a mobile phone to the display of the integrated client device, or sharing photos to a display of a home appliance in another room. Another continuity-related solution is a cross-computer session sync. When there is another computer in addition to the integrated client computing device, the integrated client computing device can enable the transfer open windows, apps and/or workflow from one device to the other. In the case of a family member who is a student doing assignment on a laptop, if they want to use a bigger screen, upon accessing the integrated client computing device, the assignment windows that were presented on the laptop's display would be mirrored or migrate onto the display screen of the integrated client computing device. More generally, continuity can be key given that the all-in-one computer may function as a secondary device, so the transition to and from another computing device can be highly beneficial.

Adaptive Experience Based on Presence

Figure 5B:
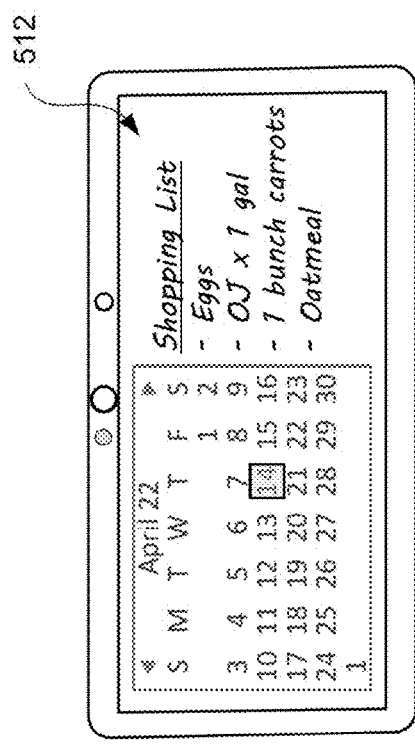
Figure 5A:
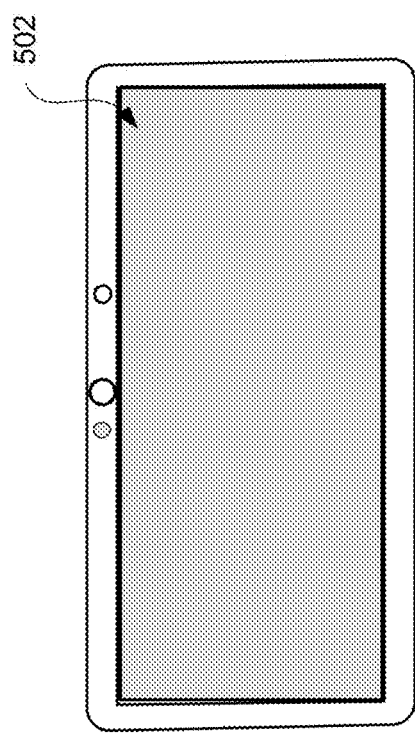

According to one aspect of the technology, presence detection enables the integrated client device to adapt to the person and the situation. For example, as shown in view 500 of FIG. 5A, the display may be off or present a screen saver 502 when nobody is nearby. Using presence sensing in accordance with applicable privacy guidelines, when the computer determines that someone has either entered the room or is within a first threshold distance from the computer, the display changes. As shown in view 510 of FIG. 5B, this can entail the display lighting up when one or more people enter the room, presenting relevant (ambient) information 512 (an ambient visual display presenting one or more items of content), such as a shared calendar and/or a grocery list. Thus, a person can simply walk towards the computer to wake it up and see what is on the ambient screen. This way the content is there when the person looks at it. The information on the ambient screen may be visible to anyone whose presence is detected (e.g., not employing facial recognition to identify which particular person is in the room).

In one scenario, the interface presents a selection of useful visual content based on current context. For instance, the calendar may show upcoming items for the next day, next few hours, the weekend, etc. Other information, which may be situation specific such as a food shopping list or a school supplies list, may be surfaced at specific times or as a reminder that that activity will occur at a particular time or day. Thus, the shopping or supplies list may be presented on Saturday morning when the activity is planned for that day, but not on Friday night. Instead, on Friday night the ambient visual display may present a notice about a family movie night, including details about a particular movie or listing new releases available for streaming. In other words, the client device can evaluate a current presentation state of the display device and select, based on the evaluation, one or more items of content to present in an ambient visual display. In these examples, the one or more items of content are associated with a family account for the client computing device. In some examples, the one or more items of content presented in the ambient visual display may be modifiable by a person (or user) without logging into the client computing device. The content may be modifiable by voice control, or by any other user input.

Then in some examples, as the person comes within a second, closer, threshold distance as detected by the presence sensor, the ambient display can adjust or change to a more active content mode (to a more specific user visual display). For instance, as shown in view 520 of FIG. 5C, the display 522 can shift to a login screen which enables the user to log into their account or a shared (family) account. In other words, the change from the ambient visual display to the user visual display can include replacement of the ambient visual display with a log-in screen. Here, if facial recognition or other contactless user identification is performed, the user may be automatically logged in without having to go through the process on the login screen. In other examples, the change from the ambient visual display to the user visual display can include modification of the ambient visual display to emphasize one or more particular content features. By way of example, this could include visually emphasizing selected content from the ambient visual display, such as specific of appointments for that person (e.g., a doctor's appointment or dental visit), reminders for scheduled meetings or homework deadlines, items on the family to-do list that are intended for that person, etc.

The reverse interface approach can occur when the user moves away or leaves the room, such as first switching to the ambient display and then the screensaver or other lock screen, or shifting directly to the lock screen. By way of example only, the first threshold distance may be between 2-5 meters from the computer or upon entry into the room, while the second threshold distance may be within 1-2 meters from the computer. Other closer and/or farther distances could be employed. In addition, more than two threshold distances may be evaluated. For instance, when moving from a second threshold distance on the order of 1-2 meters from the computer to a third threshold distance sitting in front of the computer, the displayed information may be changed. Here, for instance, this can include changing at least one feature of the user visual display, e.g., from a login entry screen to a facial recognition screen (if facial recognition is an enabled feature). Furthermore, in one example the path taken by the person may be a factor for when to display the ambient screen versus the active mode in which a login or other content is presented. Alternatively or additionally, if a UWB sensor is employed, how another computing device is held or oriented with respect to the integrated client device may also affect when to display the ambient screen versus the active mode. In one example, based on details observed by the presence sensor and/or other information, as the person comes within the second threshold distance the system may select specific content for display.

In one aspect, in accordance with applicable privacy guidelines, the system may differentiate the content to show based on identification of a particular user. For instance, this can include pre-selecting that person's account among several other individual profiles included in the family account on the integrated client device when that person comes closer. By way of example, this could include surfacing more calendar event details for that registered user, such as visually emphasizing selected content and/or providing specifics of appointments for that person (e.g., a doctor's appointment or dental visit), reminders for scheduled meetings or homework deadlines, items on the family to-do list that are intended for that person, etc.

In another scenario, certain ambient information may continue to be displayed even when the person is within the second threshold distance. For instance, the shopping list, calendar or a set of notes may be accessible for viewing and editing by anyone without having to log into the computer. Here, modification to that item can result in an update that is sent to other user devices (e.g., via a cloud sharing approach or local wireless transmission via a Bluetooth™, WiFi or cellular link). Thus, a family or shared calendar, shopping list, notes, etc. can be set as an interactive screensaver in an ambient setting. This enables the full family to be reminded of upcoming milestones at a quick glance with their communal device. The content or information can be modifiable without logging into the device. Here, according to one aspect, affirmative authorization (such as voice, face or other biometric authorization) to present such information may be required since the display may present family-related information during a logged-out/lock state.

Figure 5D:
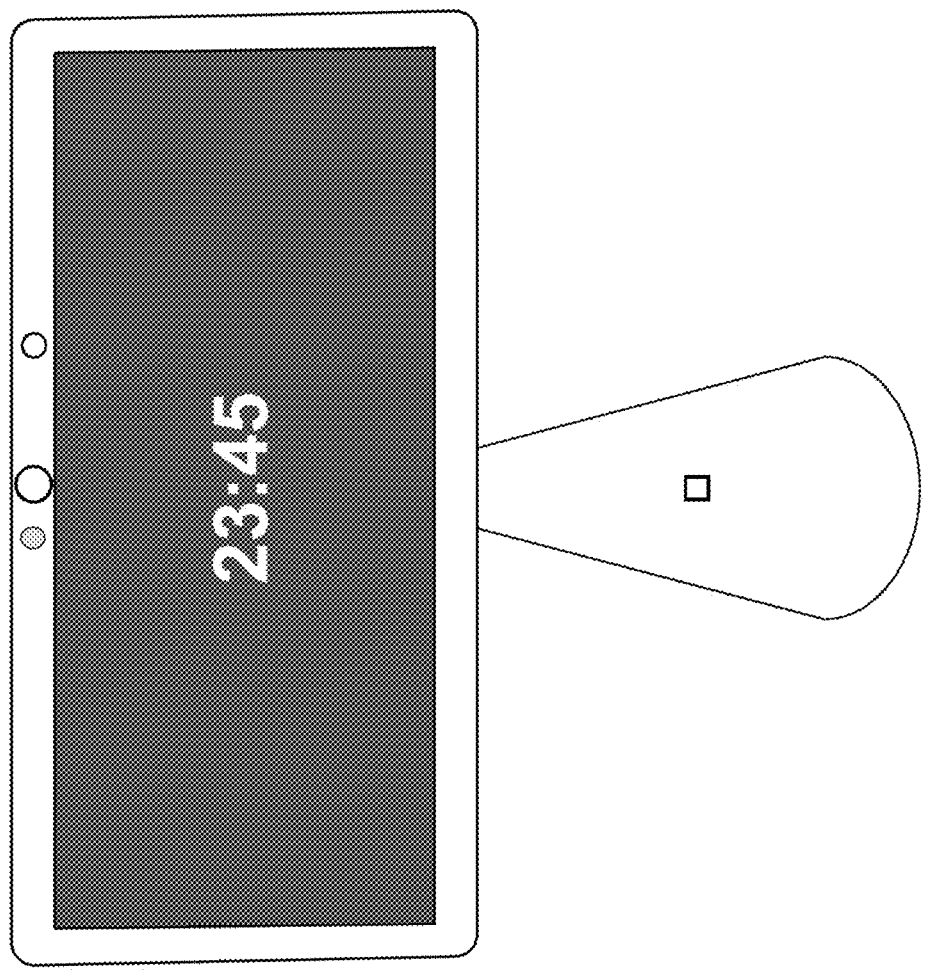

In a further scenario, selected ambient information can include a night screen that surfaces only the most relevant information (time, sunrise time, alarm time, etc.). This may present information in a low-light approach, with a dark background and only the specific information being illuminated, such as shown in view 530 of FIG. 5D. In yet another scenario, users can use an assistant feature while the display is in an ambient or lock screen mode, particularly for non-user profile reliant tasks. This can include, e.g., setting a timer (e.g., for a movie for family fun night), unit conversion, long-tail questions to other family members, etc. A user may use their voice to ask these questions and get answers. Identification by the system of which user is present may enable the assistant feature to provide targeted assistance. And in yet another scenario, the integrated client device could be employed as a "watchtower" or alarm at night. For instance, if past a certain time, detection of a human presence (unidentifiable) could result in push notifications to a family phone or other device, make a sound, or otherwise communicate to one or more family members that a human presence was detected.

A Shared Family Space

While different family members may have individual devices such as a laptop, tablet or netbook PC, mobile phones, etc., for an integrated client device that can function as a desktop that sits in the home to be shared with the family, it can be fundamentally important to create a virtual space that is shared across family members easily, while also having an intuitive and easy transition to the personalized experience of each family member. Thus, one aspect involves a family-level context and information sharing, while another aspect involves easy and smooth context switching between shared and personal experiences.

Figure 6:
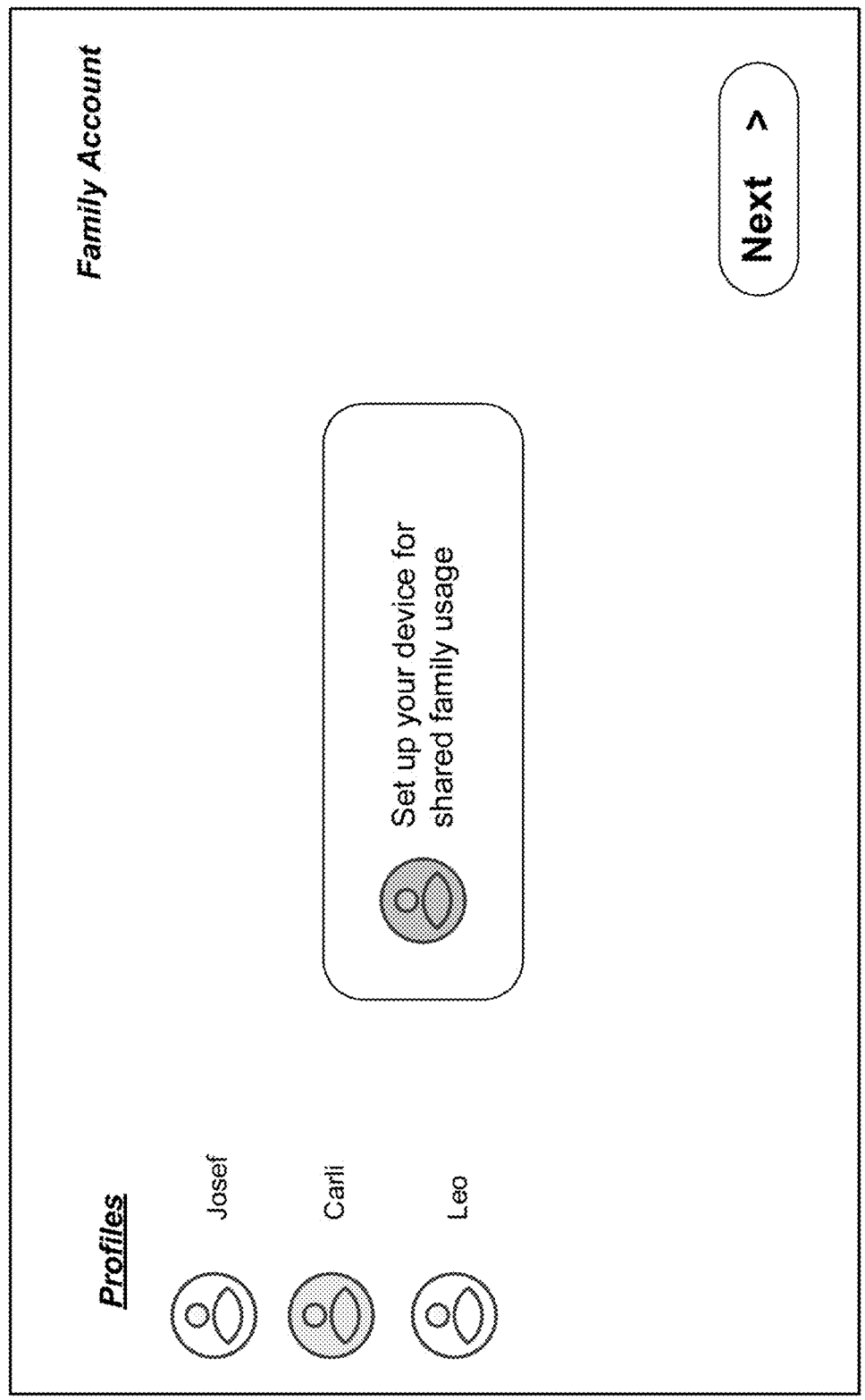
FIG. 6 illustrates and example regarding a family account in accordance with aspects of the technology.

For instance, as shown in view 520 of FIG. 5C, each individual user may have their own profile, each profile having its own set of preferences. This can include user-specific information for email, content streaming, social media, games, etc. However, according to one aspect, a family account can be created, and a set of family member profiles for each user of the computer can be embedded within the family account. In this way, the user interface of the computer can provide relevant, shared information that is purposely shared across the family. FIG. 6 illustrates an example 600 of a setup screen for a family account.

Here, the system can align with the multi profile experience for families, where each profile is owned by a family member and the main account is for the whole family. This provides family members quick and easy access to their personalized experience without having to switch accounts. The communal information associated with the shared family account can be surfaced in an intuitive way, through features like the ambient screen calendar, a family profile web browser, and/or applications that are accessed with a family profile (e.g., a streaming service or other entertainment account, digital family photo album, etc.

Seamless Switching for the Human-Computer Interface

As noted above, the display for the integrated client device may be rotatable, e.g., from a landscape-type orientation to a portrait-type orientation. In other words, the integrated housing may be rotatably coupled to the stand/base. Historically, computing devices with a touchscreen (e.g., tablets or mobile phones) tend to have a fairly consistent mode of interaction, which makes it fairly straightforward to anticipate how the user will want to use the device. However, a technical problem for a desktop-type computer with a touchscreen is that there are at least two relevant modalities; touch and keyboard/mouse, with voice commands and/or gesturing potentially offering additional modalities. The modalities can vary in utility depending on the user, the use case, and the situation. For this reason, having a smooth transition between the two experiences becomes highly important to ensure the user experience feels natural and fluid.

According to one aspect, the system may identify a likelihood or otherwise anticipate user action to be touch versus mouse/keyboard based on user patterns, app usability, or general user journey insights, and can adapt the UI to facilitate that experience. The processing of one or more systems may also be adapted. In other words, the client computing device can be configured to identify a likelihood of user input by a specific user input type and adapt operation based on the identification. By way of example, the system may employ one or more machine learning user models to understand when a user is more likely to interact with the screen using touch input versus using the mouse or the keyboard. This could also be informed by the rotation orientation in the moment, e.g., based on historical data of how the user interfaces with the device. As a result, the system could prioritize detection of input via the anticipated input source, thereby providing a faster response time to user input. By way of example, a touch screen may typically have a response time on the order of tens of milliseconds to one hundred milliseconds. But by anticipating a touch-based input rather than use of the keyboard (or mouse), the system may apply more processing resources (an example of adapting an operation) in order to reduce the touch screen response time to no more than 10 milliseconds. Latency may therefore be reduced, thereby improving user input mechanisms.

By way of example, for a large screen in landscape orientation (e.g., a screen having a diagonal size of 24 inches or larger), the user interface may enable various split screen modes to separate different apps or programs, such as a term paper on one side of the window and a web browser used to search for source material on the other side of the window. Or a drawing program having a drawing window on one side and a set of selectable tools in a separate window. Rotation of the display to portrait mode may cause the user interface to rearrange where different windows are presented (e.g., the drawing tools may move from a right side window to a lower window, while the drawing window itself may move from a left side window to an upper window). In some examples, the one or more processors are configured to identify the likelihood of a specific type of input based on the change between the landscape and portrait modes detected by the orientation sensor. In other examples, the likelihood of a specific type of independent is identified independently of the ability of the integrated housing to rotate relative to the base/stand of the client device.

Example Network

Figure 7A:
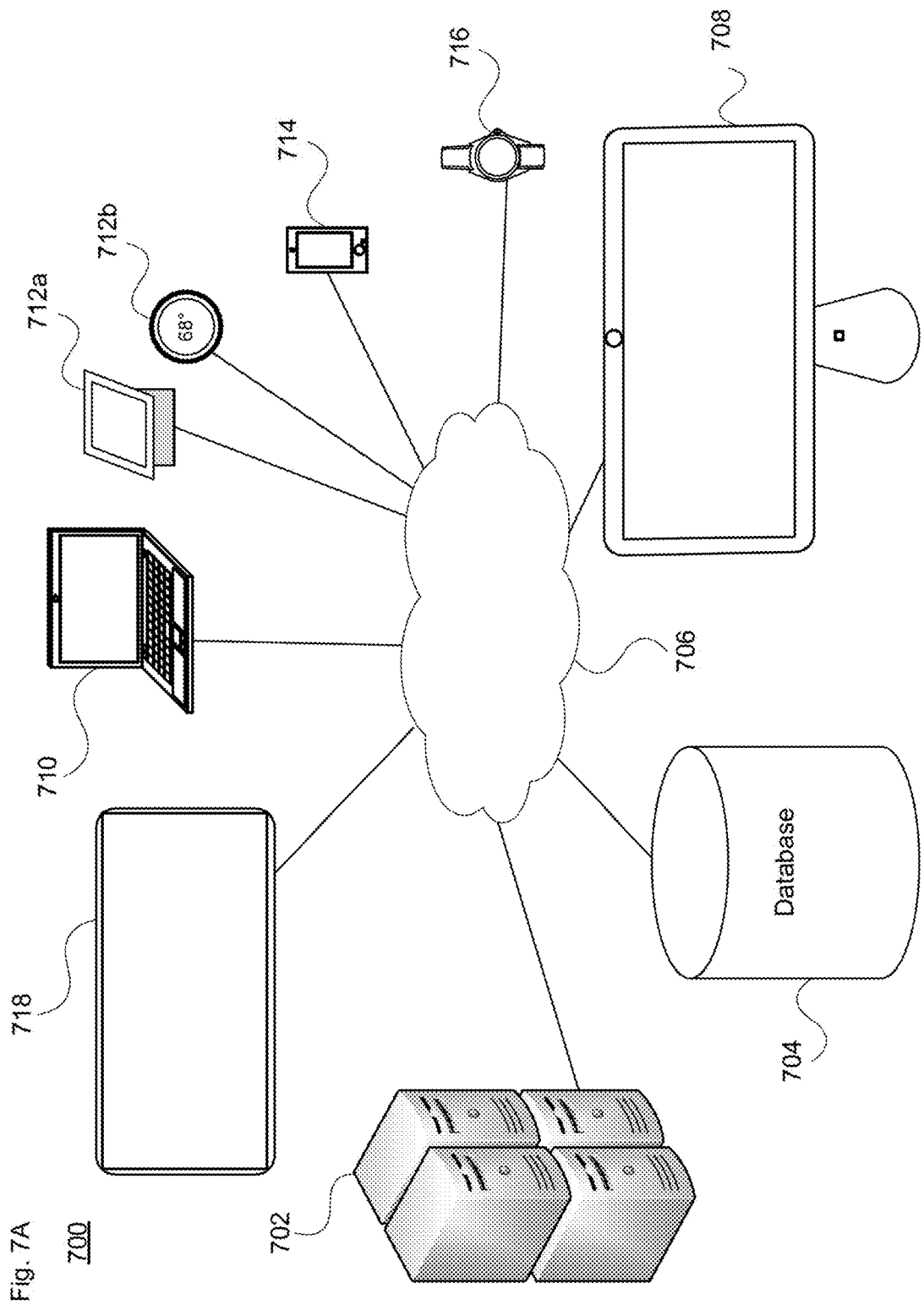
FIGS. 7A-B illustrate a system for use with aspects of the technology.
Figure 7B:
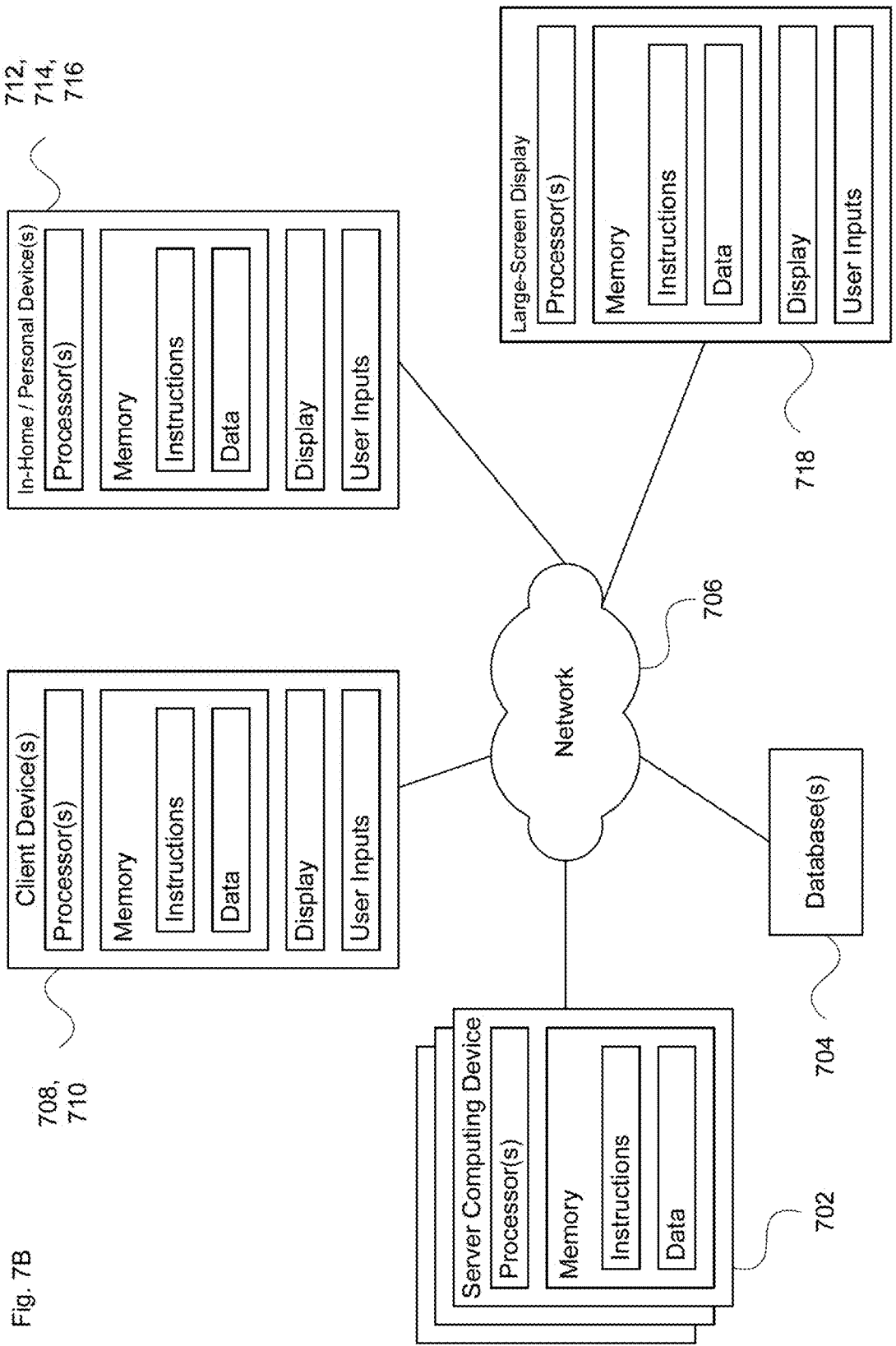

As noted above, in some situations information from the integrated client device may be communicated to other devices, such as to provide calendar updates or communicate other details of a shared family account. One example computing architecture to support this is shown in FIGS. 7A and 7B. In particular, FIGS. 7A and 7B are pictorial and functional diagrams, respectively, of an example system 700 that includes a plurality of computing devices and databases connected via a network. For instance, computing device(s) 702 may be a cloud-based server system that provides or otherwise supports one or more apps, games or other programs utilized by an integrated client computing device. Database 704 may store app/game data, user profile information, or other information. The server system may access the databases via network 706. Client devices may include one or more of a desktop-type integrated client computer 708, a laptop or tablet PC 710 and in-home devices such as smart display 712*a* and/or a smart thermostat 712*b*. Other client devices may include a personal communication device such as a mobile phone or PDA 714 or a wearable device 716 such as a smartwatch or head-mounted display (e.g., a virtual reality headset), etc. Another example client device is a large screen display such as a high-definition wall-mountable television 718, such as might be used in a living room or den during family gatherings.

In one example, computing device 702 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 702 may include one or more server computing devices that are capable of communicating with any of the computing devices 708-718 via the network 706. This may be done as part of hosting one or more collaborative apps (e.g., a videoconferencing program, an interactive spreadsheet app or a multiplayer game) or services (e.g., a movie streaming service or interactive game show where viewers can provide comments or other feedback).

As shown in FIG. 7B, each of the computing devices 702 and 708-718 may include one or more processors, memory, data and instructions. The memory stores information accessible by the one or more processors, including instructions and data that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs. Alternatively, each processor may be a dedicated device such as an ASIC, graphics processing unit (GPU), tensor processing unit (TPU) or other hardware-based processor. Although FIG. 7B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 702. Accordingly, references to a processor or computing device will be understood to include references to a collection of processors or computing devices or memories that may or may not operate in parallel.

The computing devices may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices that is operable to display information (e.g., text, imagery and/or other graphical elements). Other output devices, such as speaker(s) may also provide information to users. And as explained in detail above with regard to FIGS. 2-3, integrated client device 708 may include a presence sensor module in addition to the above-described elements.

The user-related computing devices (e.g., 708-718) may communicate with a back-end computing system (e.g., server 702) via one or more networks, such as network 706. The user-related computing devices may also communicate with one another without also communicating with a back-end computing system. The network 706, and intervening nodes, may include various configurations such as a local in-home network, and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In still a further aspect of the technology, the integrated client computing device may function as the display for another computing device. Thus, one or more video-type inputs (e.g., cabled inputs such as HDMI, VGA, etc., or via a wireless connection) for a gaming console or other device can be connected into the integrated client computing device. Here, the user(s) can access the input for the gaming console or other device via the display instead of using the operating system of the integrated client computing device. Thus, by supporting other devices via its display, the integrated client computing device can be further used to consolidate redundant hardware and provide a clean working or entertainment environment.

Exemplary Method of Operation

Figure 8:
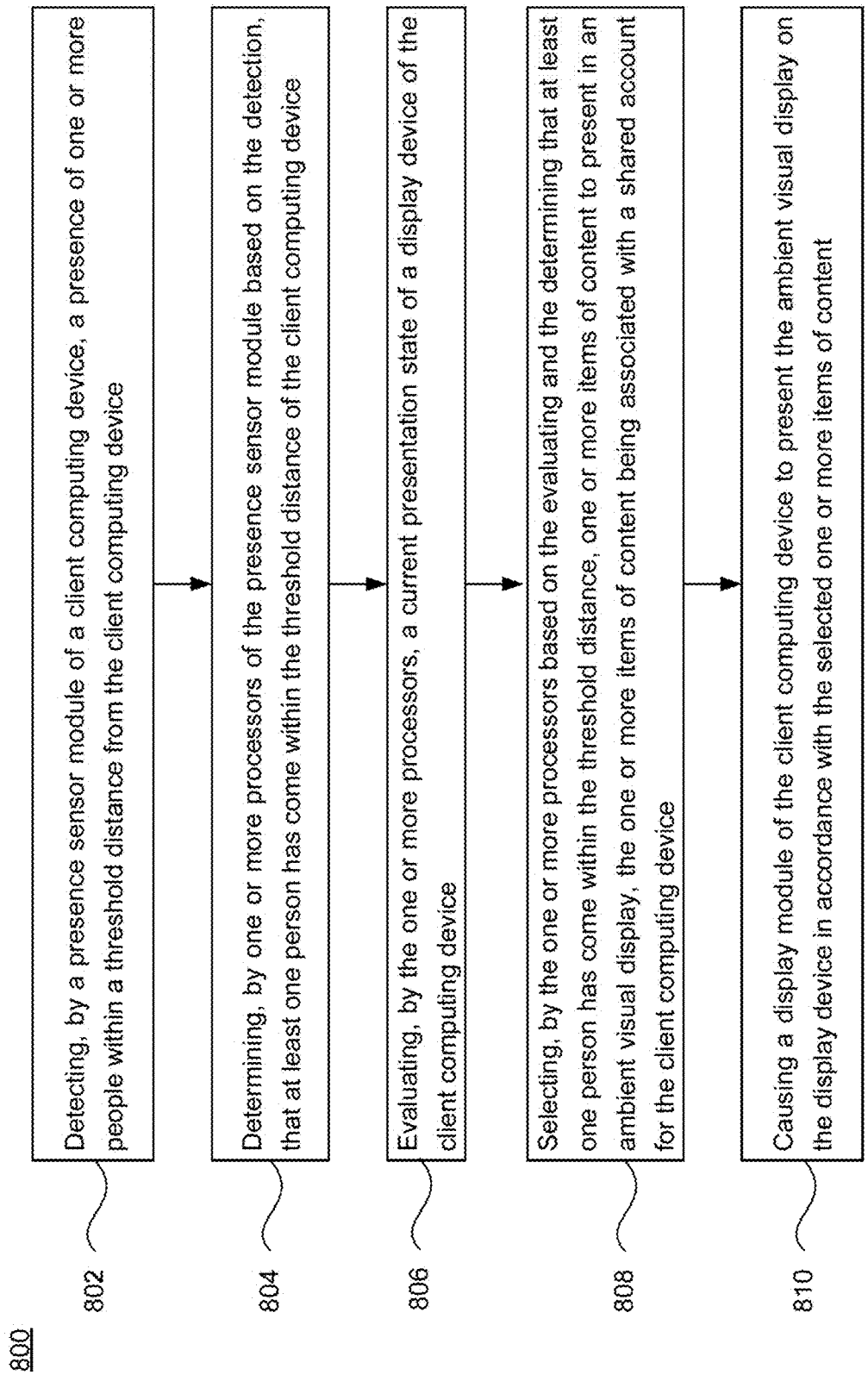
FIG. 8 illustrates a method in accordance with aspects of the technology

FIG. 8 illustrates a method 800, which at block 802 includes detecting, by a presence sensor module of a client computing device, a presence of one or more people within a threshold distance from the client computing device. At block 804 the method includes determining, by one or more processors of the presence sensor module based on the detection, that at least one person has come within the threshold distance of the client computing device. At block 806 the method includes evaluating, by the one or more processors, a current presentation state of a display device of the client computing device. At block 808 the method includes selecting, by the one or more processors based on the evaluating and the determining that at least one person has come within the threshold distance, one or more items of content to present in an ambient visual display. The one or more items of content are associated with a shared account for the client computing device. And at block 810 the method includes causing a display module of the client computing device to present the ambient visual display on the display device in accordance with the selected one or more items of content.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A client computing device, comprising:
an integrated housing that includes:
memory configured to store instructions and data for operation of the client computing device;
a display module including a display device configured to present visual content;
a user interface module operatively connected to the display module, the user interface module being configured to receive user input;
a presence sensor module configured to detect presence of one or more people within a threshold distance from the client computing device, the presence sensor module including an image sensor, wherein the presence sensor module is configured to implement one or more machine learning models to detect the presence of the one or more people in imagery taken by the image sensor; and
a processing module including one or more processors, the processing module being operatively coupled to the memory, the display module, the user interface module and the presence sensor module, the one or more processors being configured to:
determine, based on information from the presence sensor module, that at least one person has come within the threshold distance of the client computing device;
evaluate a current presentation state of the display device;
select, based on the evaluation and the determination that at least one person has come within the threshold distance, one or more items of content to present in an ambient visual display, the one or more items of content being associated with a shared account for the client computing device; and
cause the display module to present the ambient visual display on the display device in accordance with the selected one or more items of content.

2. The client computing device of claim 1, wherein the shared account includes a plurality of individual user profiles for different users.

3. The client computing device of claim 1, wherein the one or more items of content to present in the ambient visual display includes one or more selected from the group consisting of a shared calendar, a group memo and a to-do list.

4. The client computing device of claim 3, wherein the one or more items of content presented in the ambient visual display are modifiable by a person without logging into the client computing device.

5. The client computing device of claim 1, wherein:
the threshold distance is a first threshold distance from the client computing device;
the presence sensor module is further configured to detect that a person has come within a second threshold distance from the client computing device that is closer than the first threshold distance; and
the one or more processors are further configured to cause the display module to change from the ambient visual display to a user visual display based on the person coming within the second threshold distance.

6. The client computing device of claim 5, wherein the change from the ambient visual display to the user visual display includes replacement of the ambient visual display with a log-in screen.

7. The client computing device of claim 5, wherein the change from the ambient visual display to the user visual display includes modification of the ambient visual display to emphasize one or more particular content features.

8. The client computing device of claim 1, wherein the presence sensor module further includes another sensor configured to detect non-image information about whether a person is within the threshold distance of the client computing device.

9. The client computing device of claim 8, wherein the other sensor comprises one or more microphones configured to detect acoustic information within the threshold distance.

10. The client computing device of claim 8, wherein the other sensor comprises a radio frequency ultra-wideband sensor configured to detect a presence of another client computing device within the threshold distance.

11. The client computing device of claim 10, wherein the ultra-wideband sensor is configured to detect a pose of the other client computing device relative to the client computing device.

12. The client computing device of claim 1, further comprising a stand, wherein the integrated housing is releasably coupled to the stand.

13. The client computing device of claim 1, further comprising:
   a stand, wherein:
   the integrated housing is rotatably coupled to the stand, so that the display device is rotatable between a landscape mode and a portrait mode; and
   the client computing device includes at least one orientation sensor configured to detect a change between the landscape and portrait modes.

14. The client computing device of claim 13, wherein:
   the display device includes a touch screen;
   the client computing device further includes at least one of a keyboard or a mousepad; and
   the one or more processors are further configured to identify a likelihood of user input via either (i) the touch screen or (ii) the keyboard or mousepad and adapt operation based on the identification.

15. The client computing device of claim 14, wherein the one or more processors are configured to identify the likelihood based on the change between the landscape and portrait modes detected by the at least one orientation sensor.

16. The client computing device of claim 1, wherein:
   upon a determination that no people have been detected by the presence sensor module within the threshold distance for at least a threshold amount of time, the one or more processors are further configured to cause the display module to present a sleep mode screen on the display device.

17. The client computing device of claim 1, wherein the one or more processors are configured to select the one or more items of content based on whether a detected person within the threshold distance has a user profile with the client computing device.

18. A computer-implemented method, comprising:
   detecting, based on sensor data from a presence sensor of a client computing device, a presence within a threshold distance of the client computing device;
   applying, based on the detecting, one or more machine learning models to the sensor data to determine that at least one user has come within the threshold distance of the client computing device;
   evaluating a current presentation state of a display device of the client computing device;
   selecting, based on the applying and the evaluating, one or more items of content to present in an ambient visual display, the one or more items of content being associated with a shared account for the client computing device; and
   displaying the ambient visual display with the selected one or more items of content to the user.

19. The computer-implemented method of claim 18, wherein the shared account includes a plurality of individual user profiles for different users.

20. The computer-implemented method of claim 18, wherein the threshold distance is a first threshold distance from the client computing device and the method further includes:
   detecting, by the presence sensor, that a person has come within a second threshold distance from the client computing device that is closer than the first threshold distance; and
   changing from the ambient visual display to a user visual display based on the person coming within the second threshold distance.

* * * * *